US009674653B2

(12) United States Patent
Vaccari et al.

(10) Patent No.: US 9,674,653 B2
(45) Date of Patent: Jun. 6, 2017

(54) TECHNIQUES TO MANAGE CLIENT LOCATION DETECTION

(71) Applicant: Facebook, Inc., Menlo Park, CA (US)

(72) Inventors: Andrea Vaccari, San Francisco, CA (US); Yuntao Jia, Foster City, CA (US); Pierre Moreels, San Jose, CA (US); Matthew Robert Mallozzi, Fremont, CA (US); Gabriel Grise, Mountain View, CA (US); Islam Ismailov, London (GB)

(73) Assignee: FACEBOOK, INC., Menlo Park, CA (US)

( * ) Notice: Subject to any disclaimer, the term of this patent is extended or adjusted under 35 U.S.C. 154(b) by 16 days.

(21) Appl. No.: 14/636,889

(22) Filed: Mar. 3, 2015

(65) Prior Publication Data
US 2016/0261979 A1 Sep. 8, 2016

(51) Int. Cl.
*H04W 24/00* (2009.01)
*H04W 4/02* (2009.01)

(52) U.S. Cl.
CPC ................................. *H04W 4/02* (2013.01)

(58) Field of Classification Search
CPC .......... H04W 4/02; H04W 4/04; H04W 64/00
USPC ..................................................... 455/456.1
See application file for complete search history.

(56) References Cited

U.S. PATENT DOCUMENTS

| 2010/0097952 | A1* | 4/2010 | McHenry | H04L 27/0006 370/252 |
| 2010/0325194 | A1* | 12/2010 | Williamson | H04W 4/02 709/203 |
| 2011/0291885 | A1* | 12/2011 | Marshall | G01S 5/0236 342/357.42 |
| 2012/0218941 | A1* | 8/2012 | Nakatsugawa | H04W 52/0206 370/328 |
| 2012/0302256 | A1* | 11/2012 | Pai | H04W 4/02 455/456.2 |
| 2013/0244696 | A1* | 9/2013 | Schmidt | H04W 4/02 455/456.2 |
| 2014/0179337 | A1* | 6/2014 | Alpert | G01S 5/0263 455/456.1 |

\* cited by examiner

*Primary Examiner* — Timothy Pham

(57) ABSTRACT

Techniques to manage client location detection are described. In one embodiment an apparatus may comprise a location-based services support component and a client management component. The location-based services support component may be operative to determine that a network service is scheduled for a location update from a mobile device, determine a location accuracy based on the network service, and update the network service with a received location of the mobile device. The client management component may be operative to transmit a location request to the mobile device, the location request specifying the location accuracy determined based on the network service and receive a response to the location request from the mobile device, the response comprising the location of the mobile device conforming to the specified location accuracy. Other embodiments are described and claimed.

20 Claims, 13 Drawing Sheets

*800*

*Determine that a network service is scheduled for a location update from a mobile device.*
*802*

*Determine a location accuracy based on the network service.*
*804*

*Transmit a location request to the mobile device using a network interface component, the location request specifying the location accuracy determined based on the network service.*
*806*

*Receive a response to the location request from the mobile device, the response comprising a location of the mobile device conforming to the specified location accuracy.*
*808*

*Update the network service with the received location of the mobile device.*
*810*

*FIG. 8*

TECHNIQUES TO MANAGE CLIENT LOCATION DETECTION

BACKGROUND

Mobile devices may use Internet-based services that leverage the mobile device's location to implement or improve the functionality they provide. Mobile devices may possess hardware capable of determining their location via a global positioning system (GPS) receiver, Wi-Fi triangulation, cellular triangulation, or other means. This detected location may be communicated to an Internet-based service, for use by the Internet based service in the provisioning of its functionality. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to manage client location detection. Some embodiments are particularly directed to techniques to manage client location detection for location-based services provided over the Internet. In one embodiment, for example, an apparatus may comprise a location-based services support component and a client management component. The location-based services support component may be operative to determine that a network service is scheduled for a location update from a mobile device, determine a location accuracy based on the network service, and update the network service with a received location of the mobile device. The client management component may be operative to transmit a location request to the mobile device, the location request specifying the location accuracy determined based on the network service and receive a response to the location request from the mobile device, the response comprising the location of the mobile device conforming to the specified location accuracy. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 8 illustrates an embodiment of a logic flow for the location-based services system of FIG. 1.

DETAILED DESCRIPTION

Figure 1:
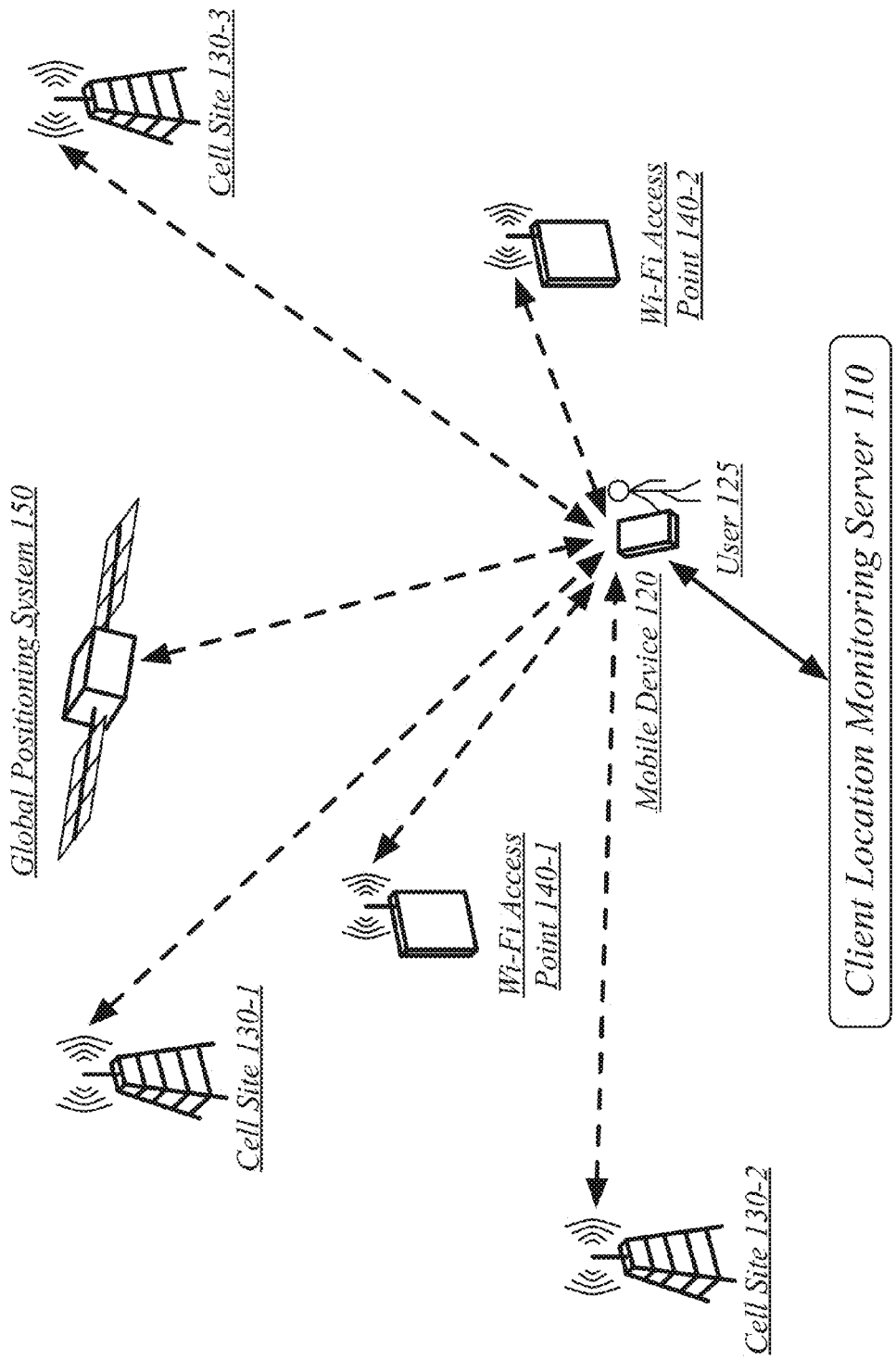
FIG. 1 illustrates an operating environment for a location-based services system.

Various embodiments are directed to a location-based services system in which mobile client location updates are intelligently managed by cooperation between a client location monitoring server and a client application on the mobile client so as to conserve energy usage by the mobile device. Mobile devices may detect their geographic location, a process known as geolocation, based on their reception of radio transmissions. Mobile devices may be limited in the amount of power they can expend between their battery being recharged. Operations for which the mobile device must use a radio transceiver to transmit or receive may be particularly prone to draining the battery due to the high power requirements of using a radio transceiver. In particular, where location-based services prefer to keep continuous, periodic, or other persistent knowledge of a mobile device's location—because, for example, the mobile device's location is a reasonable proxy for the location of the user—limiting the power used for each location update may, over the periods between which the device's battery is recharged, meaningfully reduce power usage. This may therefore extend the length of time the mobile device may go without being recharged while still receiving the benefit of the functions of location-based services. As a result, the embodiments can improve a mobile device's ability to use location-based services and may extend the access of location-based services to mobile devices.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a location-based services system 100. In one embodiment, the location-based services system 100 may comprise a computer-implemented system. Although the location-based services system 100 shown in FIG. 1 has a limited number of elements in a certain topology, it may be appreciated that the location-based services system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-*a* may include components 122-1, 122-2, 122-3, 122-4 and 122-5. The embodiments are not limited in this context.

The location-based services system 100 may comprise a client location monitoring server 110 working in coordination with a mobile device 120 to provide a user 125 access to location-based services in a manner that limits the power used in providing location updates to the location-based services to that necessary to meet the timeliness and accuracy needs of the location-based services. In some embodiments, a particular client location monitoring server 110 may coordinate the activities of a plurality of mobile devices used by a plurality of users. In some embodiments, a plurality of a client location monitoring servers may exist within the location-based services system 100, with each one coordinating a plurality of mobile devices.

A mobile device 120 may have access to a plurality of systems by which it can determine its location. For example, a mobile device 120 may be able to detect signals from a global positioning system 150 using a GPS receiver. The GPS receiver, based on the signals from the global positioning system 150, may be able to detect the geographic location of a mobile device 120 with a high degree of accuracy, to within a few feet, particularly when the GPS receiver has an unobstructed line-of-sight to the global positioning system 150, such as when outdoors. However, using the GPS receiver may result in a higher power expenditure due to the lower perceived signal strength of GPS signals by the time they reach the mobile device 120.

The mobile device 120 may be able to detect signals from one or more cell sites 130. A mobile device 120 being able to detect signals from a particular cell site provides information as to the location of the mobile device 120. The cellular signals from a cell site have a limited range, which may be the consequence of the cell site's broadcast strength, local geography (both natural and human-made), and other factors. The ability of a particular mobile device 120 to detect a cell site may be influenced by the reception ability of the mobile device 120. Similarities between the reception capabilities of various mobile devices may allow for a geographic area to be associated with each cell site, with the geographic areas associated with various cell sites communicated to the mobile device 120 from a central repository. These geographic areas may be determined according to calculations based on a cell site's broadcast strength, local geography, and other factors. These geographic areas may be determined according to sampling of which areas a cell site's transmissions may be detected at. A combination of these techniques may be used. Where a mobile device 120 can detect multiple cell sites, it may be able to refine its location to be within the area in which the geographic areas associated with the detectable cell sites overlap.

Detecting one or more cell sites 130 may use a cellular radio device (e.g., cellular receiver, cellular transceiver) on the mobile device 120. Using the cellular radio device may use less power than using the GPS receiver on the mobile device 120 and may be performed simultaneously with the cellular radio device being used for network access via a cellular network, thereby reducing the additional power devoted to determining the location of the mobile device 120. However, the location determined using one or more cell sites 130 may be less accurate than if the global positioning system 150 were used, particularly where few or only one cell site is detected. As such, using cell-site triangulation instead of GPS positioning may represent a tradeoff in which lower accuracy is accepted in return for lower power usage.

The mobile device 120 may be able to detect signals from one or more Wi-Fi access points 140. A mobile device 120 being able to detect signals from a particular Wi-Fi access point provides information as to the location of the mobile device 120. The Wi-Fi signals from a Wi-Fi access point have a limited range, which may be the consequence of the Wi-Fi access point's broadcast strength, local geography (both natural and human-made), and other factors. The ability of a particular mobile device 120 to detect a Wi-Fi access point may be influenced by the reception ability of the mobile device 120. Similarities between the reception capabilities of various mobile devices may allow for a geographic area to be associated with each Wi-Fi access point, with the geographic areas associated with various Wi-Fi access points communicated to the mobile device 120 from a central repository. These geographic areas may be determined according to calculations based on a Wi-Fi access point's broadcast strength, local geography, and other factors. These geographic areas may be determined according to sampling of which areas a Wi-Fi access point's transmissions may be detected at. A combination of these techniques may be used. Where a mobile device 120 can detect multiple Wi-Fi access points, it may be able to refine its location to be within the area in which the geographic areas associated with the detectable Wi-Fi access points overlap.

Detecting one or more Wi-Fi access points 140 may use a Wi-Fi radio device (e.g., Wi-Fi receiver, Wi-Fi transceiver) on the mobile device 120. Using the Wi-Fi radio device may use less power than using the GPS receiver on the mobile device 120 and may be performed simultaneously with the Wi-Fi radio device being used for network access via a Wi-Fi network, thereby reducing the additional power devoted to determining the location of the mobile device 120. However, the location determined using one or more Wi-Fi access points 140 may be less accurate than if the global positioning system 150 were used, particularly where few or only Wi-Fi access point is detected. As such, using Wi-Fi triangulation instead of GPS positioning may represent a tradeoff in which lower accuracy is accepted in return for lower power usage. Using Wi-Fi triangulation may use less power and result in higher accuracy than using cellular triangulation, but may not be possible in areas without Wi-Fi access point or where Wi-Fi access points have not been registered with associated geographic areas with a repository known to the mobile device 120.

The mobile device 120 may communicate with the client location monitoring server 110 to update the client location monitoring server 110 as to its current location, which may be determined by the mobile device 120 according to GPS-based location determination, Wi-Fi based location determination, cellular-tower-proximity-based location determination, or according to any other technique for determining the location of a mobile device. The client location monitoring server 110 may implement location-based network services on behalf of the mobile device 120 and/or may update other location-based network services as to the location of the mobile device 120 for their performance of location-based network services on behalf of the mobile device 120. In the performance of location-based network services the location of the mobile device 120 may be used as being sufficiently equivalent to the location of the user 125 of the mobile device 120 as to customize network service results to the location of the user 125. As such, the location of the mobile device 120 and the location of the user 125 may be considered equal, equivalent, and interchangeable.

Various location-based network services may depend on different accuracies of location for the mobile device 120 and/or user 125 for the performance of their services. For instance, a location-based network service providing weather information may only make use of an accuracy specific to a particular city—it may not have access to weather information more specific than to a particular city— and therefore may be operative to perform its location-based network service using location information with an accuracy no higher than may be used to detect what city a user 125 is in. In contrast, a user 125 looking for a mailbox within walking distance may be served by recommendations specific to their location on a particular city street so as to absolutely minimize the travel time required to mail a letter. As such, while a location-based network service providing local resource information and travel directions may be able to operate in a limited manner on merely the identification of what city a user 125 is currently in, it may perform better with, and therefore request, a user location accurate to within a few feet or, alternatively, as accurately as the mobile device 120 is able to provide. As such, a weather information location-based network service may be associated with a low level of location accuracy and a local-resource or direction-based network service may be associated with a high level of location accuracy.

Similarly, various location-based network services may depend on different recency for location information for the providing of their location-based service. For instance, a location-based network service that uses the travel history of a user 125 to select advertisements for the user 125 may not be oriented towards the immediate provisioning of advertisements but rather the construction of a user profile based, at least in part, on a location history of the user 125. This location-based network service may therefore have a low recency requirement for location updates, which may allow for longer maximum age for which a location is still relevant and a longer allowable maximum response time for the mobile device 120 to respond to a location request. In contrast, a location-based network service for performing social network sharing of a user's current location—such as to empower friends to meet up at the same location—may be better served by a higher recency for location updates so as to avoid other users being directed to a location where their friend was fifteen minutes ago but has since moved on. Such a service may therefore have a high recency requirement for location updates, which may require a shorter maximum age for which a location is still relevant and a shorter allowable maximum response time for the mobile device 120 to respond to a location request.

Location-based services system 100 may include an authorization server (or other suitable component(s)) that allows users to opt in to or opt out of having their actions logged by location-based services system 100 or shared with other systems (e.g., third-party systems), for example, by setting appropriate privacy settings. A privacy setting of a user 125 may determine what information associated with the user 125 may be logged, how information associated with the user 125 may be logged, when information associated with the user 125 may be logged, who may log information associated with the user 125, whom information associated with the user 125 may be shared with, and for what purposes information associated with the user 125 may be logged or shared. Authorization servers or other authorization components may be used to enforce one or more privacy settings of the users of client location monitoring server 110 through blocking, data hashing, anonymization, or other suitable techniques as appropriate.

Figure 2:
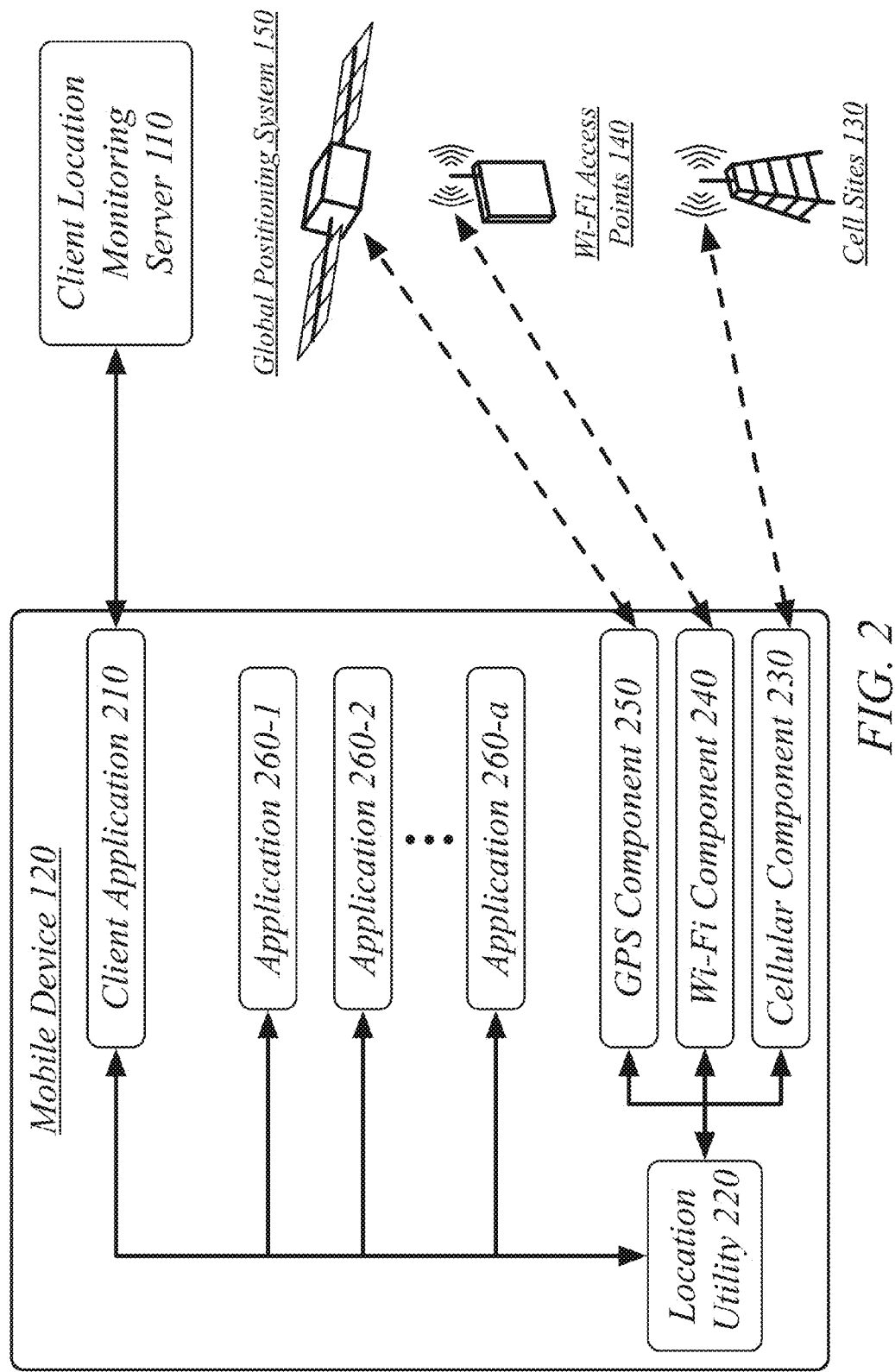
FIG. 2 illustrates an embodiment of a mobile device with a client application for the performance of location-based network services.

FIG. 2 illustrates an embodiment of a mobile device 120 with a client application 210 for the performance of location-based network services. As shown in FIG. 2, the client application 210 is one of a plurality of applications on the mobile device 120.

The mobile device 120 may possess a plurality of receivers, transmitters, and/or transceivers for the performance of radio communication. The mobile device 120 may comprise a GPS component 250 for the performance of GPS location detection. The GPS component 250 may comprise one or more software elements and one or more hardware elements. The GPS component 250 may comprise a hardware GPS receiver operative to detect GPS signals from the global positioning system 150. The mobile device 120 may comprise a Wi-Fi component 240 for the performance of Wi-Fi-based location detection. The Wi-Fi component 240 may comprise one or more software elements and one or more hardware elements. The Wi-Fi component 240 may comprise a hardware Wi-Fi receiver or transceiver operative to detect Wi-Fi signals from one or more Wi-Fi access points 140. The Wi-Fi component 240 may also be used for the performance of Wi-Fi-based network access. The mobile device 120 may comprise a cellular component 230 for the performance of cellular-based location detection. The cellular component 230 may comprise one or more software elements and one or more hardware elements. The cellular component 230 may comprise a hardware cellular receiver or transceiver operative to detect cellular signals from one or more cell sites 130. The cellular component 230 may also be used for the performance of cellular-based network access.

A plurality of applications may run on the mobile device 120, such as by executing on a processor circuit for the mobile device 120. These applications may include a client application 210 for the location-based services system 100 and additional applications 260. The client application 210 may coordinate with the client location monitoring server 110 to implement the location-based service system 100. The client application 210 may perform additional services for the user 125 of mobile device 120 beyond coordinating the updating of the location of the mobile device 120 with the client location monitoring server 110. In some cases, the services of the client application 210 performed for the user 125 of mobile device 120 may include being a local front-end for location-based services aided by the client location monitoring server 110. In some cases, the services of the client application 210 may include operations independent of or otherwise not based on location-based services or the functioning of the client location monitoring server 110.

The mobile device 120 may include a location utility 220 that manages the operations of the GPS component 250, Wi-Fi component 240, and cellular component 230 for the purposes of determining the location of the mobile device 120. The location utility 220 may comprise a component of or otherwise be included with an operating system for the mobile device 120. The location utility 220 may be distributed independently of the operating system for the mobile device 120 and may be separate from an operating system for the mobile device 120 except for that interoperation standard to software running on a mobile device managed by an operating system.

Figure 3:
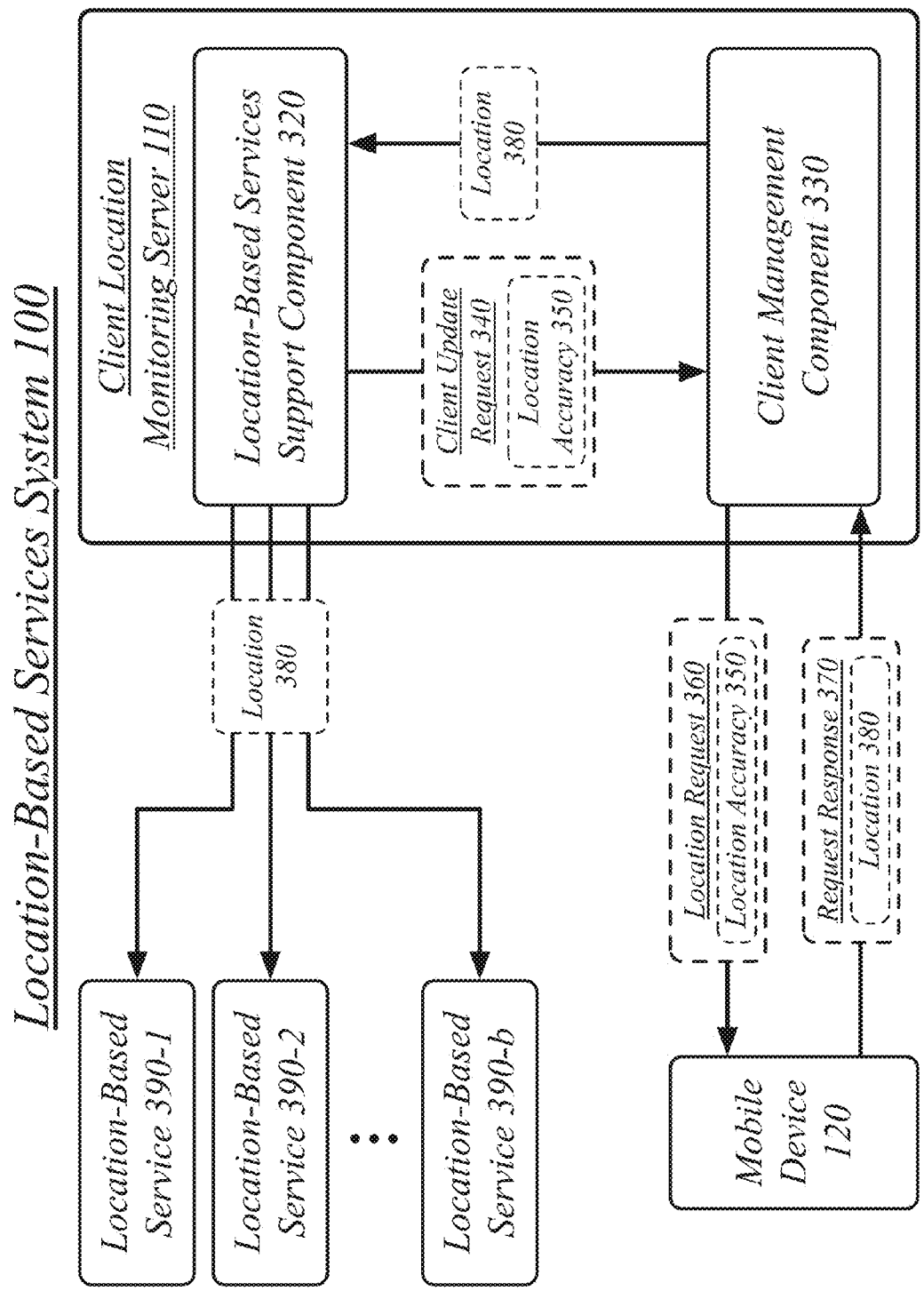
FIG. 3 illustrates a client location monitoring server interacting with location-based services.

FIG. 3 illustrates a client location monitoring server 110 interacting with location-based services 390. As shown in FIG. 3, the client location monitoring server 110 serves as an intermediary between the mobile device 120 and one or more location-based services 390.

The client location monitoring server 110 may comprise a location-based services support component 320 and a client management component 330. The location-based services support component 320 and the client management component 330 may comprise a combination of software and hardware elements, such as software elements executing on one or more processor circuits. The client location monitoring server 110 may be generally operative to mediate between location-based services 390 and a plurality of mobiles devices so as to retrieve location updates from the plurality of mobile devices for use by the location-based services 390 in the providing of their network services. The client location monitoring server 110 may request and receive location updates with location accuracies, allowable response times, allowable maximum ages, and allowable delay distances defined by the preferences or needs of the location-based services 390 so as to empower the mobile device 120 to determine its location 380 and update the location-based services 390 as to its location 380 without power consumption in excess of that used to meet the location accuracies, allowable response times, allowable maximum ages, and allowable delay distances defined by the location-based services 390.

The location-based services support component 320 may determine that a network service is scheduled for a location update from a mobile device 120, determine a location accuracy 350 based on the network service, and update the network service with a received location 380 of the mobile device 120. The network service may comprise one of the location-based services 390. The network service may comprise a general location-monitoring component, such as one to monitor the location of the mobile device 120 within defined bounds outside the direct needs of any particular location-based service of the location-based services 390. The location-based services support component 320 may submit a client update request 340 to the client management component 330, the client update request 340 comprising a location accuracy 350 based on the preferences of the network service.

The client management component 330 may transmit a location request 360 to the mobile device 120, the location request 360 specifying the location accuracy 350 requested of the mobile device 120 determined based on the network service and receive a request response 370 to the location request 360 from the mobile device 120, the request response 370 comprising the location of the mobile device 120 conforming to the specified location accuracy 350. The client management component 330 may pass the location 380 to the location-based services support component 320.

The request response 370 comprising the location 380 may also include an accuracy of the location 380. For instance, where mobile device 120 makes use of multiple location-based services of the plurality of location-based services 390, a location 380 may be returned to the client location monitoring server 110 that satisfies the preferences of some but not all of the location-based services used by the mobile device 120. As such, the mobile device 120 may specify the accuracy of the location 380 in the request response 370. Similarly, the client management component 330 may pass the location 380 to the location-based services support component 320 along with the accuracy of the location 380.

The request response 370 may include a plurality of locations of the mobile device 120. For instance, the request response 370 may include a history of locations of the mobile device 120. The mobile device 120 may maintain a history of determined locations, each associated with a particular time of determination and degree of accuracy. The client location monitoring server 110 may be informed of this complete history, such as for the performance of retrospective analysis of the history of the location of the mobile device 120 is to be performed. The mobile device 120 may maintain knowledge of which locations from its history have already been communicated to the client location monitoring server 110 and only transmit locations not previously transmitted. This may mean that a request response 370 includes all those and only those locations determined since the previous update transmitted to the client location monitoring server 110. Even where retrospective analysis is not to be performed, the plurality of locations may be useful in that some may be more recent while some may be more accurate, such as where a mobile device 120 informs the client location monitoring server 110 that a GPS-based location determination had been performed a few minutes in the past but that a cellular-based location determination had been performed during initiation of a cellular connection, with the mobile device 120 communicating both so as to empower location-based services 390 to select between or combine a more-accurate location determination and a more-recent location determination.

The location-based services support component 320 may transmit the location 380 to one or more of the location-based services 390. The location-based services support component 320 may maintain a registry for each mobile device managed my the client location monitoring server 110 of which location-based services of the location-based services 390 are registered to receive location updates about the mobile devices. For instance, mobile device 120 may make use of a plurality of location-based services, each of which it is registered with in the registry of the client location monitoring server 110. The user 125 of mobile device 120 may have agreed to privacy conditions for location sharing for each of the plurality of location-based services with which it is registered.

The location-based services support component 320, upon receiving location 380 from the client management component 330, may transmit the location 380 to those location-based services with which the mobile device 120 is registered as using. The location-based services support component 320 may transmit the location 380 to only those location-based services with which the mobile device 120 is registered where the accuracy and recency of the location 380 is within the preferences of the location-based service. Alternatively or additionally, the location 380 may be transmitted to the registered location-based services along with its accuracy and recency. The client location monitoring server 110 may leave the location-based services 390 responsible for determining whether a received location 380 is within the tolerances based on the received accuracy and recency. Alternatively, location-based services 390 may only be transmitted a location 380 within their specified tolerances, with indicated accuracy and recency comprising additional information that one or more of the location-based-services 390 may leverage to improve the services they provide to the user 125 of the mobile device 120.

The location-request 360 specifying the location accuracy 350 may empower the mobile device 120 to select between at least GPS-based location determination, Wi-Fi-based location determination, and cellular-tower-proximity based location determination. The location accuracy 350 may specify what form of location determination to use. The location accuracy 350 may specify an accuracy in terms of allowable margin for error, such as in a certain number of feet, meters, or other unit of measurement.

The location request 360 may further specify a maximum age for which the location of the mobile device 120 may be reported. The age of a location may correspond to the length of time between when the location of the mobile device 120 is determined and when it is reported to the client location monitoring server 110. It may be advantageous to allow the location of the mobile device 120 to be reported with a delay between the use of a device for geolocation and their use of a device for network activity. A geolocation device may be active at a first time and a network device active at a second, later time. If the span of time between the first time and the second time is less than the specified maximum age, then the client application 210 may piggyback on the activations of the geolocation device and the network device so as to determine the location 380 of the mobile device 120 and communicate that location 380 to the client location monitoring server 110 without activating either device itself. Both or either of the activation of a geolocation device or network device may be due to the activity of a different application of the applications 260 on the device, distinct from the activity of the client application 210.

The location request 360 may further specify a maximum response time for the mobile device 120 to respond to the location request 360. The response time may correspond to the length of time between the request for the location of the mobile device 120 and when that location is reported back to the client monitoring server 110. The beginning of this length of time may be specified according to a variety of different starting references. For instance, where the location is requested by a location-based service, the maximum response time may correspond to the time of request by the location-based service, which time of request may be communicated to the mobile device 120. The maximum response time may correspond to the determination by the location-based services support component 320 determining that a location is to be requested from the mobile device 120. The maximum response time may be measured from the time that the mobile device 120 receives the location request 360. The client management component 330 may be operative to specify a maximum response time in the location request 360 so as to satisfy requirements of a location-based service or the location-based services support component 330. The client management component 330 may, for example, apply a time differential between when it receives the client update request 340 and the generation of the client update request 340 by the location-based services support component 320 or a request by a location-based service to reduce the time allowed to the mobile device 120 by the time differential and thereby accurate communicate the maximum response time. The maximum response time may be specific as a duration (e.g., a number of seconds, minutes, etc.) or as a deadline (e.g., a specific time by which the request response 370 comprising the location 380 must be transmitted back to the client management component 330). Similar to the allowance for a maximum age, the use of a maximum response time may allow for the location-based services system 100 to piggyback off of location detection or network activity performed on behalf of another service or application.

The location request 360 may comprise multiple requests for location. In some cases, different location-based services of the location-based services 390 may have distinct preferences for received location information. For example, a first location-based service 390-1 may request a first location update with a low maximum age and/or low response time (e.g., 1 minute) but with a low requested location accuracy (e.g., accurate to within 1 mile): requesting the mobile device 120 to quickly respond with a low-accuracy determination of its location. A second location-based service 390-2 may request a second location update with a high maximum age and/or high response time (e.g., 30 minutes) but with a high requested location accuracy (e.g., accurate to within 10 feet): requesting the mobile device 120 to eventually respond with a high-accuracy determination of its location.

In some embodiments, a plurality of requests for location may be transmitted to the mobile device 120 as two separate location requests, with each of the plurality of requests for location corresponding to a particular location-based service of a plurality of location-based services 390. However, in some embodiments, a plurality of requests for location may be transmitted to the mobile device 120 in a single location request 360 so as to limit the bandwidth, and therefore power, used on the mobile device 120 in receiving the location request 360 comprising the multiple requests for location. The mobile device 120 may send multiple requests responses to the multiple requests for location, such as to use a low-power general determination of location for a response to the first example request and to wait for another application on the mobile device 120 to request a high-power high-accuracy determination of location to use for a response to the second example request.

The client management component 330 may generate, update, and otherwise maintain a probabilistic model of the location of the mobile device 120. This probabilistic model may correspond to an estimation of the location of the mobile device 120 with an estimated error of the estimated location of the mobile device 120. This estimated error may incorporate the accuracy of the determination of the location of the mobile device 120, such as whether the location of the mobile device 120 was determined according to GPS, cellular triangulation, Wi-Fi triangulation, or other techniques, wherein a less-accurate technique for determining the location of the mobile device 120 corresponds to a larger estimated error for the estimated location of the mobile device 120. This estimated error may incorporate an estimated rate of change of location of the mobile device 120, wherein a greater estimated rate of change of the location of the mobile device 120 corresponds to a larger estimated error for the estimated location of the mobile device 120.

The estimated rate of change of the location of the mobile device 120 may be calculated according to a variety of techniques and incorporate a plurality of signals. The estimated rate of change may be calculated based on the rate of change of location detected in the previous series of received locations. For example, where a sequence of locations for the mobile device 120 indicates that the mobile device 120 is moving rapidly due to the high degree of change in location (e.g., location detections minutes apart in time are miles apart in location), the estimated rate of change of location may indicate that the estimated error of the location should increase rapidly (e.g., at a mile a minute) as the current time grows further from the time of the most-recently-received location. In contrast, where a sequence of locations for the mobile device 120 indicates that the mobile device 120 is moving slowly or is stationary due to the low degree of change in location (e.g., location detections tens of minutes apart in time are in the same approximate location), the estimated rate of change of location may indicate that the estimated error of the location should increase slowly even as the current time grows further from the time of the most-recently-received location.

The estimated error and estimated rate of change of the location may make use of information known about the location of the mobile device 120. For example, if a mobile device 120 is detected as being present on a highway or other form of transportation then a high rate of change of location may be predicted on the assumption that the user of the mobile device 120 is using the transportation and may continue to do so and thereby continue to have its received locations rapidly degrade in quality over time. In contrast, if a mobile device 120 is detected as being present at an establishment at which users commonly remain for an extended period—a shopping mall, an eating establishment, a residence (particularly their own), a business (particularly their place of work), etc.—then a low rate of change of location may be predicted on the assumption that the user of the mobile device 120 is engaging with the establishment and will continue to do so for some time. The distinction between locations that imply a high rate of change of location and low rate of change of location may be determined according to various techniques.

In some embodiments, the location-based services system 100 may automatically classify locations based on an identified type of location: residence, in-person service business, method of transportation, etc. In some embodiments, the location-based services system 100 may alternatively or additionally classify locations as corresponding to a high or low rate of change of location based on historical location data. The location-based services system 100 may collect, archive, and analyze historical location data received as part of location updates from mobile devices to determine a typical, average, or otherwise representative rates of change for a location or area. A high or low rate of change of location may be specified in terms of an average rate of change in location associated with a particular location, area, or geographical feature (e.g., road, train, home, business). As such, the location-based services system 100 may be able to, for example, distinguish between a restaurant at which people frequently spend little time (e.g., a take-out coffee shop) and a restaurant at which people frequently spend considerable time (e.g., a sit-down dinner establishment).

The classification of locations and estimation of error and rate of change of location associated with the locations may be user-specific. The location-based services system 100 may collect, archive, and analyze user-specific historical location data to determine a rate of change associated with how long a specific user spends in a particular location or type of location. For example, some users may spend considerable time in a coffee shop once present (e.g., thirty or more minutes spent drinking their beverage within the coffee shop itself) and others may spend little times in a coffee shop when present (e.g., 10 or less minutes spent waiting in line, ordering, and receive a beverage before taking the beverage to go). A user-specific length of time may be calculated based on the user-specific historical location data. Similarly, a user may be classified into one of two or more user types (e.g., those who spend considerable time in a coffee shop per visit and those that do not) associated with a location based on their user-specific historical location data. This user-specific length of time and/or user classification may be used to determine the estimated error and estimated rate of change of location for the user in response to the determination that a user is present in a particular location.

The estimated error of a location, which may vary based on the difference in time between the present and the last-received location update from a mobile device 120, may be used to determine whether a location 380 requested by a location-based service falls within the requested or desired accuracy of the location-based service. The client management component 330 may receive the client update request 340 and the associated location accuracy 350 from the location-based services support component 320. The client management component 330 may retrieve a currently-known location 380 for the mobile device 120 and determine whether the location 380 falls within the requested accuracy based on the estimated error of the location 380. The estimated error of the location 380 may be dependent on the age (length of time since measurement) of the location 380, such as where an rate of change of location has been estimated for the mobile device 120.

Similarly, where a new location request is desired in order to achieve the requested accuracy, various elements of the location request 360 may be specified based on the estimated rate of change of location. For instance, a more recent location may be requested where a mobile device 120 is estimated to be moving rapidly than where a mobile device 120 is estimated to be movingly slowly or not moving. The client management component 330 may combine the accuracy with which the mobile device 120 will determine its location with the estimated rate of change of location to determine a maximum age for the location 380 that will allow the requested location accuracy 350 to be achieved. For example, a location determination accurate to within 10 yards, an estimated rate of change of 20 yards per minute, and a requested accuracy of 90 yards, would indicate that a location older than four minutes would not be sufficiently accurate. In general, a higher estimated rate of change of location may correspond to more frequent requests for location and lower requested ages of received locations. In general, a lower estimated rate of change of location may correspond to less frequent requests for location (in comparison to those for higher estimated rate of change of location) and higher allowable ages of received locations.

Figure 4:
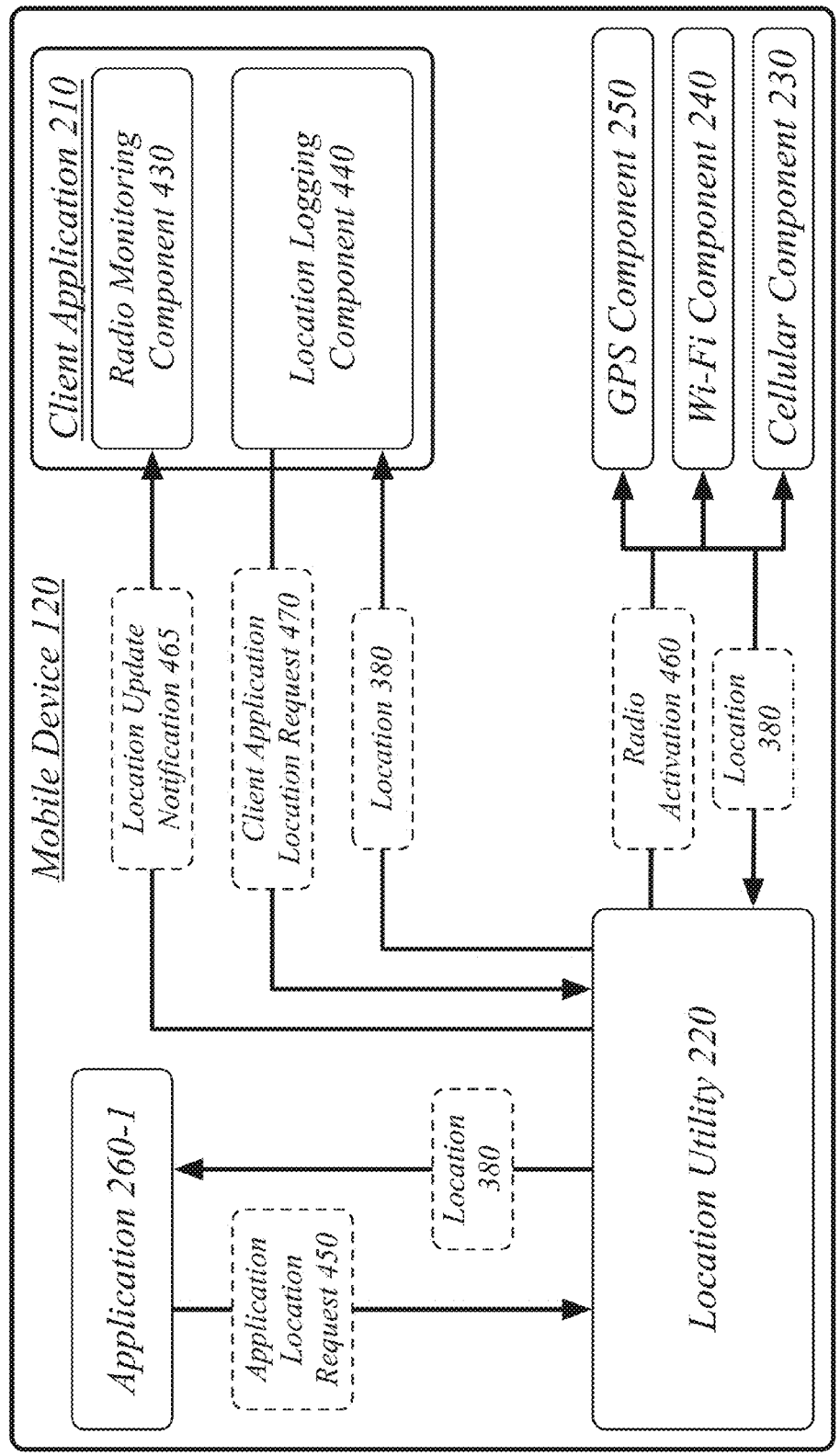
FIG. 4 illustrates a client application on a mobile device taking advantage of another application requesting a location.

FIG. 4 illustrates a client application 210 on a mobile device 120 taking advantage of another application 260-1 requesting a location 380.

The other application 260-1 may comprise one of a plurality of applications 260 on the mobile device 120. Each of the plurality of applications 260 may perform foreground and background tasks on behalf of a user of the mobile device 120. These background and foreground tasks may include the use of location detection and the use of network activity. One or more of the plurality of applications 260 may be user-installed applications. The plurality of applications 260 may be distinct from the client application 210 representing the location-based services system 100 on the mobile device 120 and the operation of the client application 210 may be distinct from the operation of the plurality of applications 260 except to the extent that it may piggyback on location detection and network activity performed on behalf of the plurality of applications 260.

The application 260-1 may transmit an application location request 450 to the location utility 220. The application location request 450 may comprise a request to receive the current location of the mobile device 120 or receive the location of the mobile device 120 within various requirements of recency and accuracy. The application location request 450 may comprise a specific indication of a technique to be used for location determination, such as GPS-based location determination.

In response to receiving the application location request 450 from the application 260-1 the location utility 220 may return the location 380 without activating any radio devices, such as where a location 380 of the mobile device 120 within bounds specified by the application location request 450 is already known by the location utility 220. However, in other cases, the location utility 220 may perform a radio activation 460 of one or more radio devices in response to the application location request 450 by the application 260-1. The radio activation 460 may be received by one or more of the GPS component 250, Wi-Fi component 240, and cellular component 230. The one or more radio devices may perform operations to determine information relevant to the determination of a location of the mobile device 120 and may report a location 380 to the location utility 220. In some embodiment various measurements (e.g., cellular signal strengths, Wi-Fi hotspot detections) may be reported to the location utility 220 with the location utility 220 determining the location 380 based on the measurements. The location utility 220 may report the location 380 to the application 260-1 in response to the application location request 450 and the information learned from the radio activation 460.

In some embodiments, the location 380 reported to the client location monitoring server 110 may comprise the various measurements reported to the location utility 220, such as cellular signal strengths, the cellular towers associated with each cellular signal strengths, Wi-Fi access points detected, the signal strengths associated with each Wi-Fi access point detected, and any other information related to the determination of a location of a mobile device 120. In some cases, the client location monitoring server 110 may have access to superior data or more extensive processing resources for the inference of location based on the reported measurements. In some cases, the client location monitoring server 110 may report one or more measurements as part of the location 380 transmitted to one or more of the location-based services 390. A location-based service may use these measurements to customize services for a user of the mobile device 120, such as by, for example, identifying a user's travel routine based on repeated occurrences of Wi-Fi hotspots in the measurements reported to the location-based service.

The client application 210 may comprise a radio monitoring component 430 and a location logging component 440. The radio monitoring component 430 may be generally arranged to monitor the activation of radio devices of the mobile device 120. The radio monitoring component 430 may, for instance, register with an operating system of the mobile device 120 to receive notification of radio devices of the mobile device 120 being activated. The radio monitoring component 430 may register with a location utility 220 to be notified whenever a location of the mobile device 120 is determined. The radio monitoring component 430 may register with a location utility 220 to be notified the next time a location of the mobile device 120 is determined. The location logging component 440 may be generally arranged to perform location requests and receive locations from the location utility 220. The location logging component 440 may be arranged to log received locations for eventual reporting to the client location monitoring server 110.

The location utility 220 may, in response to having determined location 380 based on radio activation 460, transmit a location update notification 465 to the radio monitoring component 430 of the client application 210. The location update notification 465 may comprise a signal to the radio monitoring component 430 that a location determination has been performed by the location utility 220 using one or more radio devices. Upon determining a location 380 for the mobile device 120 the location utility 220 may reference a location-update registry and inform every application listed in the registry that a location update has been performed.

Upon the radio monitoring component 430 receiving the location update notification 465 from the location utility 220, the location logging component 440 may perform a client application location request 470 with the location utility 220. The client application location request 470 may comprise a request to receive the current location 380 of the mobile device 120. The location logging component 440 may receive the location 380 from the location utility 220 in response to the client application location request 470. The location 380 delivered to the location logging component 440 of the client application 210 may be the same location 380 determined on behalf of the other application 260-1. The location 380 delivered to the location logging component 440 may therefore have been generated without any radio device activation being performed on behalf of the client application 210. The location 380 delivered to the location logging component 440 may therefore have been generated based on radio device activation performed exclusively on behalf of one or more other applications on the mobile device 120 distinct from the client application 210.

In some embodiments, the location 380 may be delivered to the location logging component 440 without the exchange of the location update notification 465 and the client application location request 470 being performed in response to the location update notification 465. In these embodiments, the location utility 220 may maintain a registry of one or more applications interested in receiving a location update once one has been performed on behalf of another application. The location utility 220 may transmit the location 380 to the one or more other application, which may include the client application 210, in response to the location 380 being determined on behalf of the other application 260-1.

The client application 210 may transmit the location 380 to the client location monitoring server 110 once received from the location utility 220. As such, the location request 360 may be transmitted to a location application 210 on the mobile device 120. The request response 370 may be received by the client management component 330 from the location application 210 on the mobile device 120. The request response 370 may be received from the location application 210 on a timing determined by the location application 210 based on the location application 210 determining that the mobile device 120 had determined its location to within the location accuracy 350 in response to a request by a different application 260-1 on the mobile device 120.

Figure 5:
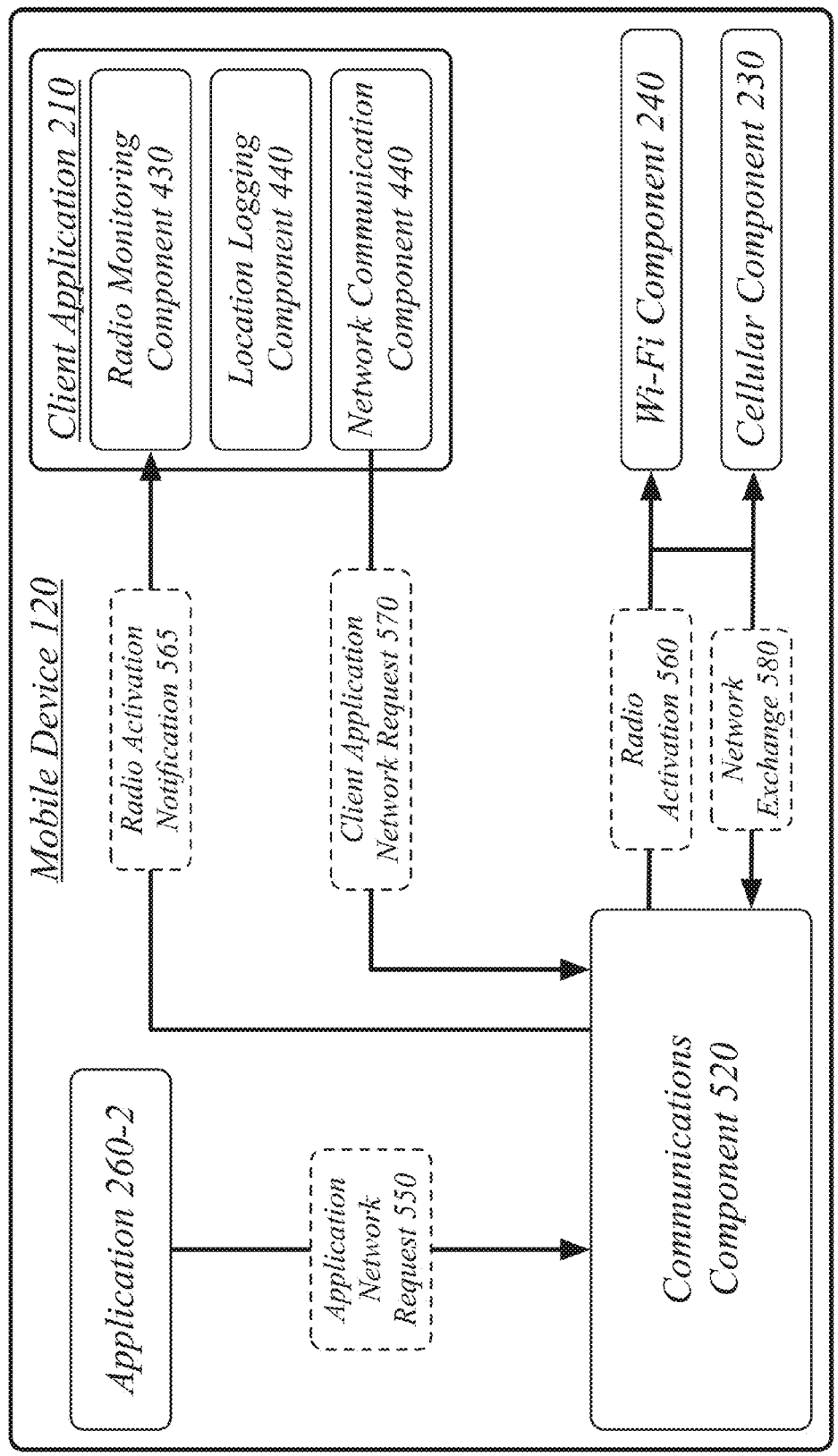
FIG. 5 illustrates a client application on a mobile device taking advantage of another application causing a radio to be activated.

FIG. 5 illustrates a client application 210 on a mobile device 120 taking advantage of another application 260-2 causing a radio to be activated for network traffic.

The application 260-2 producing the network activation the client application 210 piggybacks on may be a different application 260-2 than the application 260-1 producing the application location request 450 taken advantage of by the client application 210 for determination the location 380. However, in some cases, the same application may produce both an application location request 450 and an application network request 550 with the client application 210 taking advantage of both.

The application 260-2 may transmit an application network request 550 to a communications component 520. The communication component 520 may comprise an operating system component or other operating system utility for managing network access. The application network request 550 may comprise a request to perform network activity, such as to establish a network connection or transmit data for application 260-2 across a network.

In response to the application network request 550 the communications component 520 may perform a radio activation 560 of one or more radio devices, such as a Wi-Fi component 240 or cellular component 230. The radio activation 560 may be performed in order to engage in network activity with the one or more radio devices activated, such as the performance of the application network request 550. The communications component 520 may perform network exchange 580 using the activated radio device. Network exchange 580 may include network traffic performed on behalf of one or more applications, such as application network request 550 for application 260-2.

The communications component 520 may signals the radio monitoring component 430 with a radio activation notification 565, the radio activation notification 565 indicating to the client application 210 that one or more radio devices for the mobile device 120 are active and available for network activity. The radio monitoring component 430 may have registered with the communications component 520 to receive a notification of the next time, every time, or every time during a specified period, in which a radio device is active and available for network activity. In response to the radio monitoring component 430 receiving the radio activation notification 565 a network communication component 440 may perform a client application network request 570 with the communications component 520. The network communication component 440 may manage network communication for the client application 210, such as may be used for updating the client location monitoring server 110 with the location 380 of the mobile device 120. The network exchange 580 may include the traffic comprising the client application network request 570.

The client application 210 may transmit the location 380 to the client location monitoring server 110 once it has received a radio activation notification 565. As such, the location request 360 may be transmitted to a location application 210 on the mobile device 120. The request response 370 may be received by the client management component 330 from the location application 210 on the mobile device 120. The request response 370 may be received from the location application 210 on a timing determined by the local application 210 corresponding to the mobile device 120 already having an active radio transmitter in response to a request by a different application 260-2 on the mobile device 120.

In some embodiments, the radio monitoring component 430 may register with an operating system of the mobile device 120 when one or more other applications on the device wake up and perform the client application network request 570 in response to being notified that one or more of the one or more other applications have woken up. The radio activation notification 565 may therefore comprise a notification that one of the other applications flagged by the radio monitoring component 430 has become active. The client application 210 may be configured with a list of applications which are known to perform network activity on waking up and thereby rely on the waking of those applications to determine that network activity will be performed such that a radio device will be active, limiting the additional device power used in performing the client application network request 570 for the client application 210.

For example, an email application, messaging application, social networking application, web browser, or other Internet-service driven application may perform network activity on a repeating schedule: waking up, checking for information with a network service relevant to a user of the mobile device 120, possibly displaying a notification for the user of the mobile device 120, and then going to sleep for a defined amount of time. The client application 210 may maintain a list of known applications of these types: specific email client, specific messaging apps, specific social networking apps, specific web browsers, etc. The operating system of the mobile device 120 may allow an application, such as client application 210, to register to be woken up when another application on the mobile device 120 wakes up. The client application 210 may register to be woken up when any of the applications on the list of known applications wakes up and perform client application network request 570 in response.

The use of application-specific notifications may be of particular value in operating environments in which the operating system of the mobile device 120 does not empower applications to be woken generally on network activity or network device activity, with the waking of a member of the list of known applications serving as a proxy for knowledge of network activity. This may result in cases where network activity is performed without the client application 210 being woken, such as where the network activity is performed by an application not on the list of known applications. This may also result in cases where network activity is performed by the client application 210 without a network device having already been activated by another application. For example, a user accidentally loading a web browser, and therefore not accessing a web page, may trigger the client application 210 to perform the client application network request 570. As such, where the waking of a member of the list of known applications serves as a proxy for knowledge of network activity the client application 210 may merely be significantly increasing the probability of a network device already being active when it performs client application network request 570 as compared to guaranteeing that a network device is already active when client application network request 570 is performed.

In some embodiments, whether the client application 210 delays in transmitting a location update to the client location monitoring server 110 may be determined based on the extent of the change in location for the mobile device 120. One or more of the location-based services 390 may perform customization of network services based on the location of a user, with small changes in location producing small or no change in the customization for the user, but with large changes in location producing large or, respectively, extant change in the customization for the user. As such, one or more of the location-based services 390 may specify a delay distance that indicates a cutoff between small changes in location for the mobile device 120 that may be reported based on a power-saving schedule and large changes in location for the mobile device 120 that should be reported immediately.

The client application 210 may receive a new location 380 for the mobile device 120 from the location utility 220 that, as compared to a previously-received location of the mobile device 120, indicates that a particular change in location of the mobile device 120. The magnitude of the change in location may correspond to a geographic distance between the new location 380 and the previous location. This magnitude of the change in location may be compared to one or more delay distances included in the location request 360. Where the magnitude of the change in location exceeds one or more delay distances, the location 380 may be immediately reported to the client location monitoring server 110 even where this would result in the client application 210 being responsible for the activation of a radio device. Where the magnitude of the change in location does not exceed any specified delay distance, the reporting of the location 380 may be delayed according to the techniques described herein, such as until it is determined that a radio device for communication has likely already been activated on behalf of another application on the mobile device 120. It will be appreciated that where the magnitude of the change in location precisely matches a specified delay distance that a particular one of permission to delay and instruction to immediately report may be specified in an embodiment.

As such, the request response 370 may be received from the mobile device 120 by the client location monitoring server 110 on a timing determined based on the magnitude of a change in location determined by the mobile device 120. The location request 360 may specify one or more delay distances. The location request 360 may indicate a permission to the mobile device 120 to delay transmission of the request response 370 to the location request 360 when the location 380 of the mobile device 120 indicates a change in location of the mobile device 120 since a previous update less than the delay distance. The location request 360 may indicate an instruction to the mobile device 120 to activate a radio transmitter of the mobile device 120 for transmission of the request response 370 when the location 380 of the mobile device 120 indicates a change in location of the mobile device 120 since a previous update greater than the delay distance.

The client location monitoring server 110 may therefore be operative to use a specified delay distance to control the frequency with which a mobile device 120 reports location updates, with the reporting frequency being relative to a combination of the display distance and the extent of location change of the mobile device 120. The client location monitoring server 110 may be operative to receive location updates from a mobile device 120 on a frequency and at a promptness determined according to the extent of location change of the mobile device 120. As such, the use of a delay distance in a location request 360 may empower the client location monitoring server 110 to customize a tradeoff between frequency or promptness of location updates with power usage by the mobile device 120.

In some embodiments, the delay distance may be determined based at least in part on power usage information known about the mobile device 120. A device with a hardware or software configuration known to be prone to power supply problems—e.g., a power-hungry processing unit, graphics unit, display, operating system, etc.—may be provided with a larger delay distance. A device currently low on power, such as may be reported to the client location monitoring server 110 by the mobile device 120, may be provided with a larger delay distance. In general, the client location monitoring server 110 may be operative to customize the delay distance to configuration and status information of the mobile device 120. The client location monitoring server 110 may customize the delay distance to reduce the possibility of the mobile device 120 sufficiently expending its battery so as to become unavailable to the user 125 of the mobile device 120.

The client location monitoring server 110 may maintain a store of configuration information about mobile devices, including mobile device 120, and use the configuration information to customize delay distances for the mobile device 120. The client location monitoring server 110 may be configured with power usage statistics related to known configurations of mobile devices and use the power usage statistics in combination with the configuration information to customize delay distances. The power usage statistics may be modified over time as information is gathered related to power usage specific to various configurations.

Figure 6:
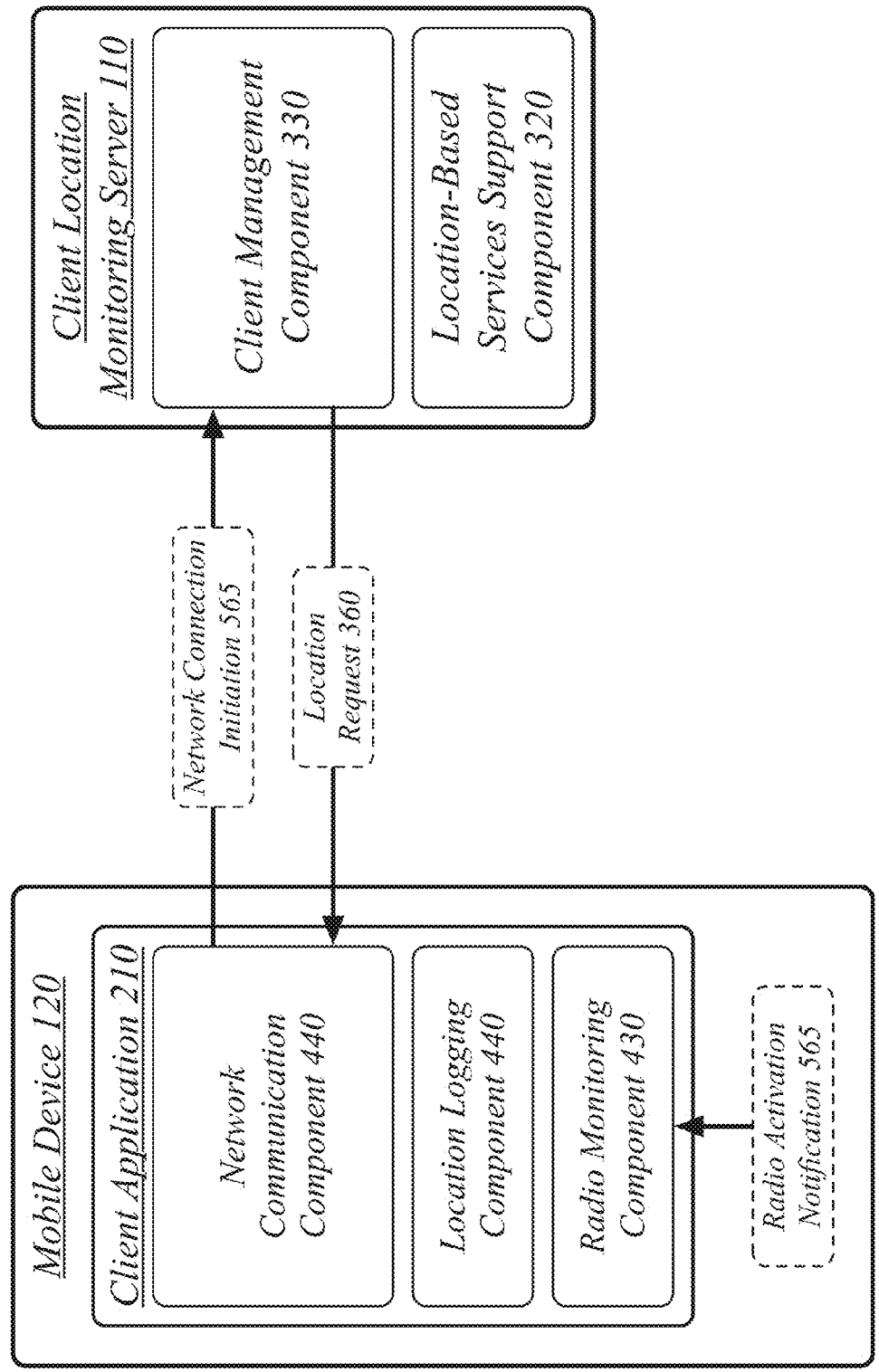
FIG. 6 illustrates a client location monitoring server taking advantage of a mobile device having an active network connection.

FIG. 6 illustrates a client location monitoring server 110 taking advantage of a mobile device 120 having an active network connection.

In some embodiments, the client management component 330 may delay the transmission of a location request 360 to the mobile device 120 until it has active knowledge that the mobile device 120 has an active radio receiver. The client management component 330 may queue one or more requests for a location update and wait until a network connection is active between the client location monitoring server 110 and the client application 210. Once a network connection is active the client management component 330 may transmit the location request 360 to the client application 210, the location request 360 comprising the one or more requests for a location update.

This may correspond to the client management component 330 delaying the transmission of a location request 360 to the mobile device 120 until the client application 210 initiates a network connection with the client location monitoring server 110. The network communication component 440 of the client application 210 may perform network connection initiation 565, such as by opening a transmission control protocol/internet protocol (TCP/IP) or uniform datagram protocol/internal protocol (UDP/IP) socket with the client management component 330 of the client location monitoring server 110. In response to the network connection initiation 565, the client management component 330 may transmit the location request 360 to the network communication component 440. Because the client application 210 may delay in opening the network connection until another application activates a radio device on the mobile device 120, the location request 360 being transmitted to the client application 210 on the mobile device 120 may be in response to the client application 210 indirectly indicating, via the network connection initiation 565, that the mobile device 120 has an active radio receiver activated on behalf of another application on the mobile device 120.

Where a maximum response time is determined for a location request 360, such as where a maximum response time is specified by a location-based service, the client management component 330 may limit how long it delays for a network connection initiation 565 before actively attempting to contact the client application 210. Where a location-based service specifies a maximum response time relative to its own request for the location update, any time spent delaying by the client management component 330 may count against the maximum response time allowed for the maximum response time. As such, the client management component 330 may be operative to reserve a portion of the maximum response time for the client application 210. For instance, the client management component 330 may be operative to reserve a percentage, such as fifty percent, of the maximum response time for use by the client application 210. The client management component 330 may be operative to delay initiation of a network connection with the client application 210 until only a predefined portion of a maximum response time remains and to initiate the network connection with the client application 210 once only the predefined portion of the maximum response time remains.

Figure 7:
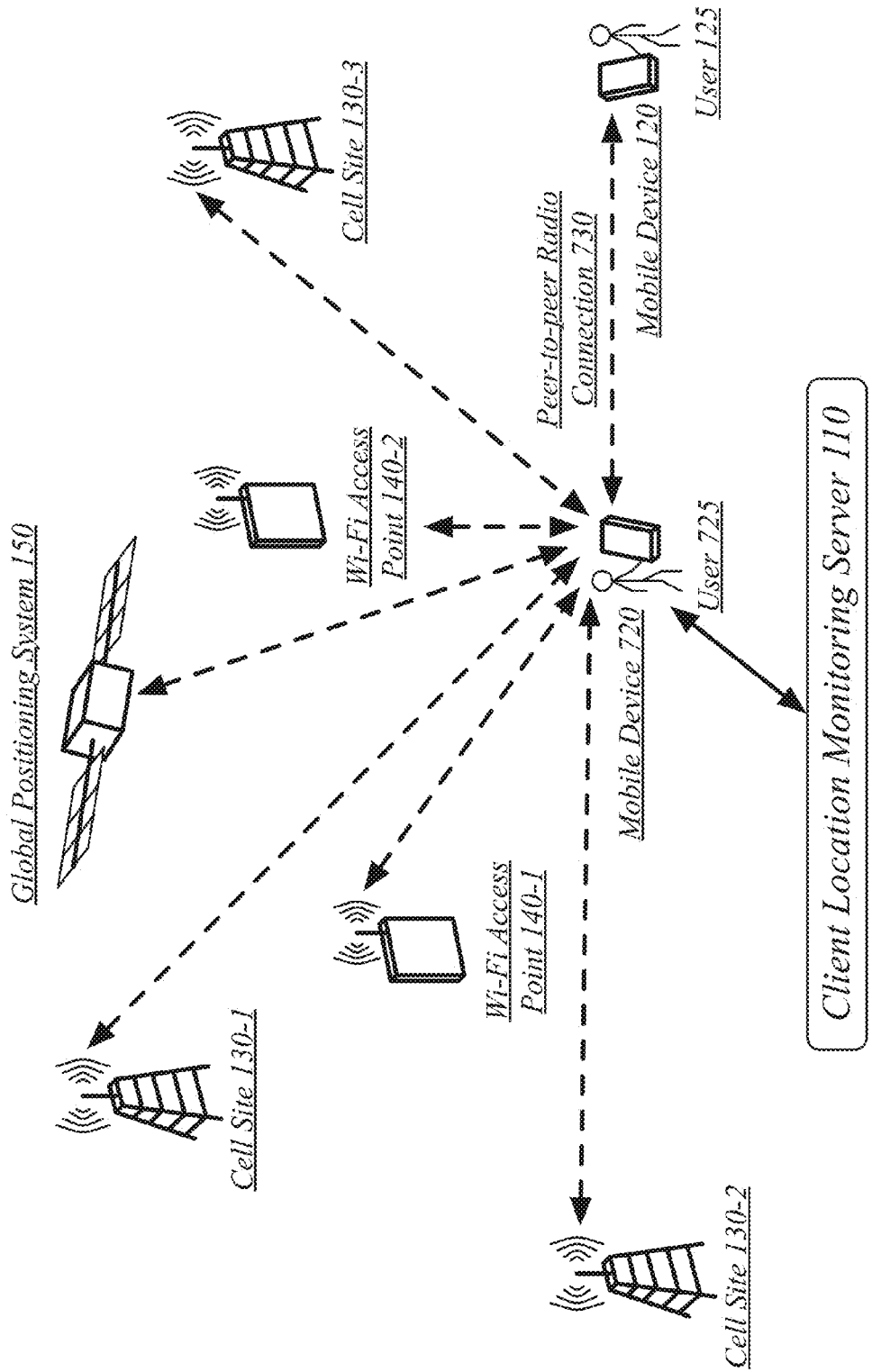
FIG. 7 illustrates a mobile device taking advantage of another mobile device's location-detection or active network connection.

FIG. 7 illustrates a mobile device 120 taking advantage of another mobile device 720 performing location-detection or having an active network connection.

The various radio-based communication techniques available to a mobile device 120 may differ in the amount of power expended to use them. For instance, using a cellular component 230 to access a cell site 130-1 may expend more power than using a Wi-Fi component 240 to access a Wi-Fi access point 140-1. Further, a peer-to-peer radio connection 730, that empowers communication directly between two mobiles devices without going through an intermediary device, may expend even less power. The mobile device 120 and mobile device 720 may directly communicate over, for example, a Bluetooth link without use of an intermediary for communication.

In one scenario, a first user 125 and a second user 725 may respectively use a first mobile device 120 and a second mobile device 720 within sufficient proximity to use a peer-to-peer radio connection 730 to communicate. The peer-to-peer radio connection 730 may be established between the first mobile device 120 and the second mobile device 720 and used to communicate location information between the first mobile device 120 and the second mobile device 720. This transmission of location information between the mobile devices may empower at least one of the mobile devices to avoid using a separate radio device, such as for location determination or network activity via an intermediary cellular site or Wi-Fi access point.

For example, the first mobile device 120 may receive the location of the second mobile device 720 over the peer-to-peer radio connection 730 and use the location of the second mobile device 720 as a proxy for the location of the first mobile device 120, thereby obviating the need to perform location detection via a different radio device (e.g., GPS component 250) that may expend more power than the power used for the peer-to-peer radio connection 730. Due to the first mobile device 120 and the second mobile device 720 not necessarily being in precisely the same geographic location, the location of the second mobile device 720 may be a lower-quality determination of the location of the first mobile device 120 than it was for the second mobile device 720. If the location determination of the second mobile device 720 was at a first accuracy, the location determined by using this location as a proxy may be at a second accuracy determined by the combination of the first accuracy and the broadcast range of the peer-to-peer radio connection 730, with this second accuracy being lower (less accurate) than the first accuracy. However, the second accuracy may still fall within the location accuracy 350 specified as part of a location request 360, and the location determination of the second mobile device 720 may therefore be adequate for determining the location 380 for a request response 370 to the location request 360.

In another example, the location of the first mobile device 120 may be transmitted to the client location monitoring server 110 by the second mobile device 720, obviating the need for the first mobile device 120 to perform network activity via a different radio device (e.g., cellular component 230, Wi-Fi component 240) that may expend more power than the power used for the peer-to-peer radio connection 730. Where both the first mobile device 120 and the second mobile device 720 execute instances of the client application 210 (e.g., separate installations of a common application), the instances of the client application 210 may cooperate to report location updates using only a single network connection for the two (or more) devices.

The peer-to-peer radio connection 730 may be used by the first mobile device 120 to transmit its location 380 to the second mobile device 720. The second mobile device 720 may transmit the location 380 of the first mobile device 120 to the client location monitoring server 110 using a radio device that uses more power than expended to perform the peer-to-peer radio connection 730. In some cases, the location 380 may be transmitted to the client location monitoring server 110 in a network transaction that also include a location of the second mobile device 720. As such, the transmission of the location update to the client location monitoring server 110 for the first mobile device 120 may not expend any additional power than the power expended for the performance of a location update for the second mobile device 720.

In some cases, the location 380 reported to the client location monitoring server 110 may be a location 380 determined directly by the first mobile device 120, such as by using a radio receiver on the first mobile device 120. In other cases, the location 380 reported to the client location monitoring server 110 may be a location 380 determined by the second mobile device 720, the location of the second mobile device 720 being used as a lower-quality proxy for the location of the first mobile device 120.

In some cases, the first mobile device 120 and the second mobile device 720 may use the peer-to-peer radio connection 730 to share the workload, and therefore power usage, of determining location 380 and reporting the location 380 to the client location monitoring server 110. In these cases, one of the first mobile device 120 and the second mobile device 720 may determine the location 380 and the other perform the network transaction of reporting the location 380 to the client location monitoring server 110 on behalf of both mobile devices. Where the two mobile devices are responding to location requests specifying different accuracies, the mobile device with the higher requested accuracy may perform the location determination with the mobile device with the lower requested accuracy performing the network activity. Where more than two mobile devices are sharing determined locations and/or grouping the transmission of their location to a client location monitoring server 110 any division of responsibility for location determination and network exchange may be performed.

Two or more mobile devices may determine that they are sufficiently co-located to perform a peer-to-peer radio connection 730 using a variety of techniques. One or both of the first mobile device 120 and the second mobile device 720 may perform radio-based scanning using a network protocol to discover active devices in the area. Active devices may be interrogated as to whether they support location or network-update sharing using the client application 210. One or both of the first mobile device 120 and the second mobile device 720 may receive a notification from the client location monitoring server 110 that they are sufficiently geographically proximate to use a peer-to-peer radio connection 730 to share locations or group location updates. For example, the first mobile device 120 and second mobile device 720 may independently perform location updates to the client location monitoring server 110. The client location monitoring server 110 may determine that the first mobile device 120 and second mobile device 720 are geographically proximate. The first mobile device 120 and second mobile device 720 may then share locations and/or group location updates so long as they remain geographically proximate (e.g., both at a same coffee shop, both carpooling together, both working at a same office). The client location monitoring server 110 may transmit contact information to one or both of the first mobile device 120 and second mobile device 720 to empower them to form peer-to-peer radio connection 730, such as network identifiers for one or both of the mobile devices for use in addressing an outgoing connection from one mobile device to the other.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 8 illustrates one embodiment of a logic flow 800. The logic flow 800 may be representative of some or all of the operations executed by one or more embodiments described herein.

In the illustrated embodiment shown in FIG. 8, the logic flow 800 may determine that a network service is scheduled for a location update from a mobile device 120 at block 802. The network service may correspond to a location-based service 390-1 of a plurality of location-based services 390. The determination that the network service is scheduled for the location update may correspond to the reception of a location request from the network service. The determination that the network service is scheduled for the location update may be based on the registration of a location update schedule for the location-based service 390-1 with a client location monitoring server 110. In some embodiments, each of a plurality of location-based services 390 may have a location update schedule registered with a client location monitoring server 110.

The logic flow 800 may determine, using a processor circuit, a location accuracy 350 based on the network service at block 804. The location accuracy 350 may be specified by the network service and may be included in the registration of the network service with a client location monitoring server 110.

The logic flow 800 may transmit a location request 360 to the mobile device using a network interface component, the location request specifying the location accuracy 350 determined based on the network service at block 806. The location request 360 may further specify at least one of a maximum age for which the location of the mobile device 120 may be reported, a maximum response time for the mobile device 120 to respond to the location request, and a delay distance indicating a maximum distance the reporting of which may be delayed. Any or all of a maximum age, a maximum response time, and a delay distance may be specified by the network service, such as part of a registration of a location update schedule with a client location monitoring server 110.

The logic flow 800 may receive a response to the location request from the mobile device, the response comprising a location of the mobile device conforming to the specified location accuracy at block 808. In some embodiments, the location request 350 may be transmitted to a location application, such as a client application 210 associated with the location-based services system 100, on the mobile device 120, with the response comprising a request response 370 received from the client application 210. The response may be received from the local application on a timing determined by the local application corresponding to the mobile device 210 already having an active radio transmitter or based on the local application determining that the mobile device 120 had determined its location 380 to within the location accuracy 350 in response to a request by a different application on the mobile device 120.

The logic flow 800 may update the network service with the received location 380 of the mobile device 120 at block 810. In some cases, where multiple location-based services have registered for or requested a location update from a particular mobile device 120, all of the registered or requesting multiple location-based services may be updated with the received location 380.

The embodiments are not limited to this example.

Figure 9:
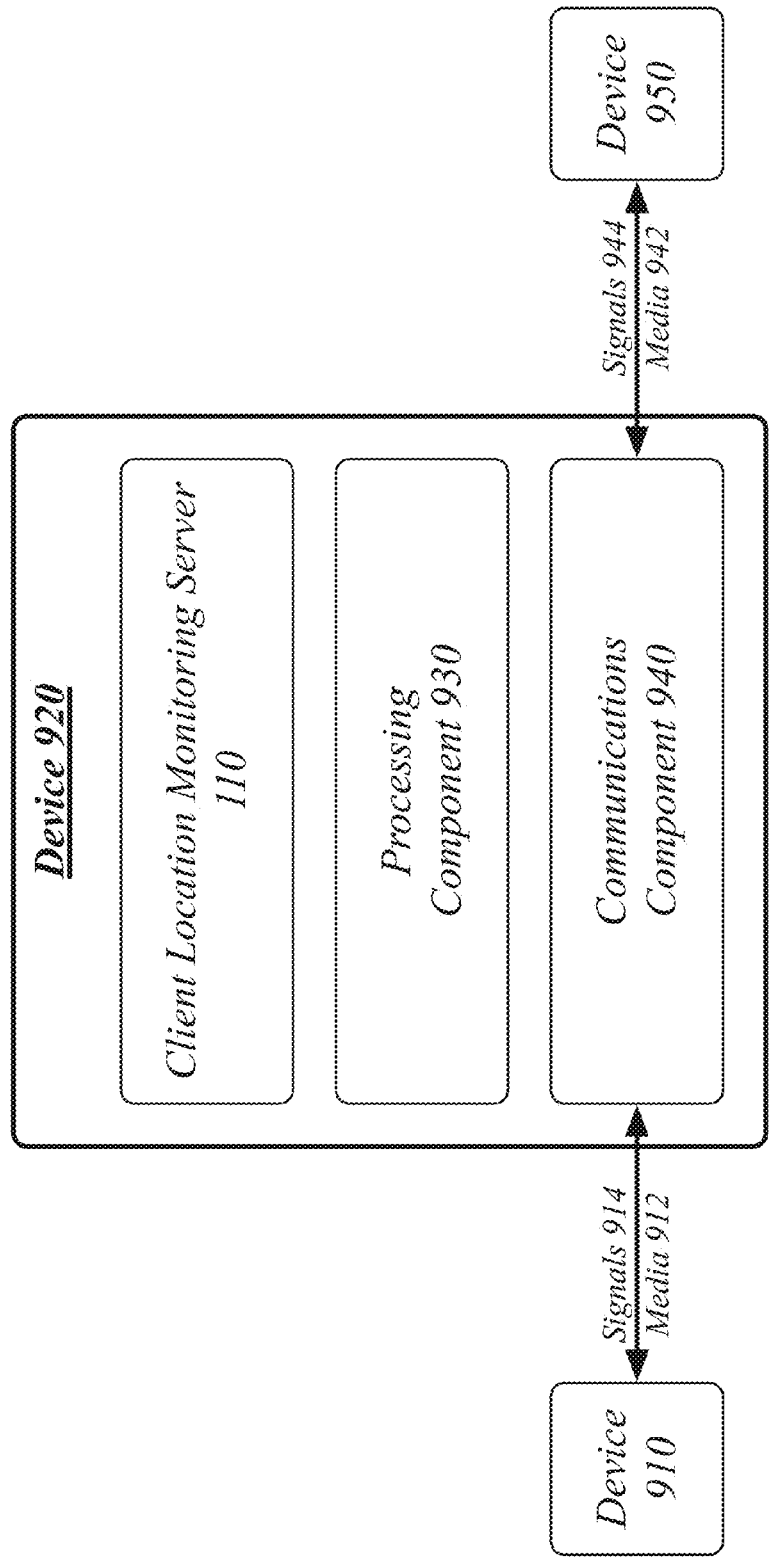
FIG. 9 illustrates an embodiment of a centralized system for the location-based services system of FIG. 1.

FIG. 9 illustrates a block diagram of a centralized system 900. The centralized system 900 may implement some or all of the structure and/or operations for the location-based services system 100 in a single computing entity, such as entirely within a single device 920.

The device 920 may comprise any electronic device capable of receiving, processing, and sending information for the location-based services system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 920 may execute processing operations or logic for the location-based services system 100 using a processing component 930. The processing component 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 920 may execute communications operations or logic for the location-based services system 100 using communications component 940. The communications component 940 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 940 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 912, 942 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 920 may communicate with other devices 910, 950 over a communications media 912, 942, respectively, using communications signals 914, 944, respectively, via the communications component 940. The devices 910, 950 may be internal or external to the device 920 as desired for a given implementation.

Device 920 may implement the client location monitoring server 110 in a single device. It will be appreciated that even in those embodiments where the client location monitoring server 110 is implemented in a single device that multiple client location monitoring servers may be used by the location-based services system 100 and that the location-based services system 100 may therefore make use of distributed computing. Device 910 may correspond to a mobile device, such as mobile device 120, making use of the client location monitoring server 110. Device 950 may correspond to a second mobile device, such as mobile device 720, making use of the client location monitoring server 110. The signals 914, 944 transmitted over media 942, 912 may therefore correspond to the transmission of location requests and location updates between the client location monitoring server 110 and the devices 910, 950. In some cases, the signals 914, 944 may correspond to the coordination of a peer-to-peer radio connection 730 between the devices 910, 950.

Figure 10:
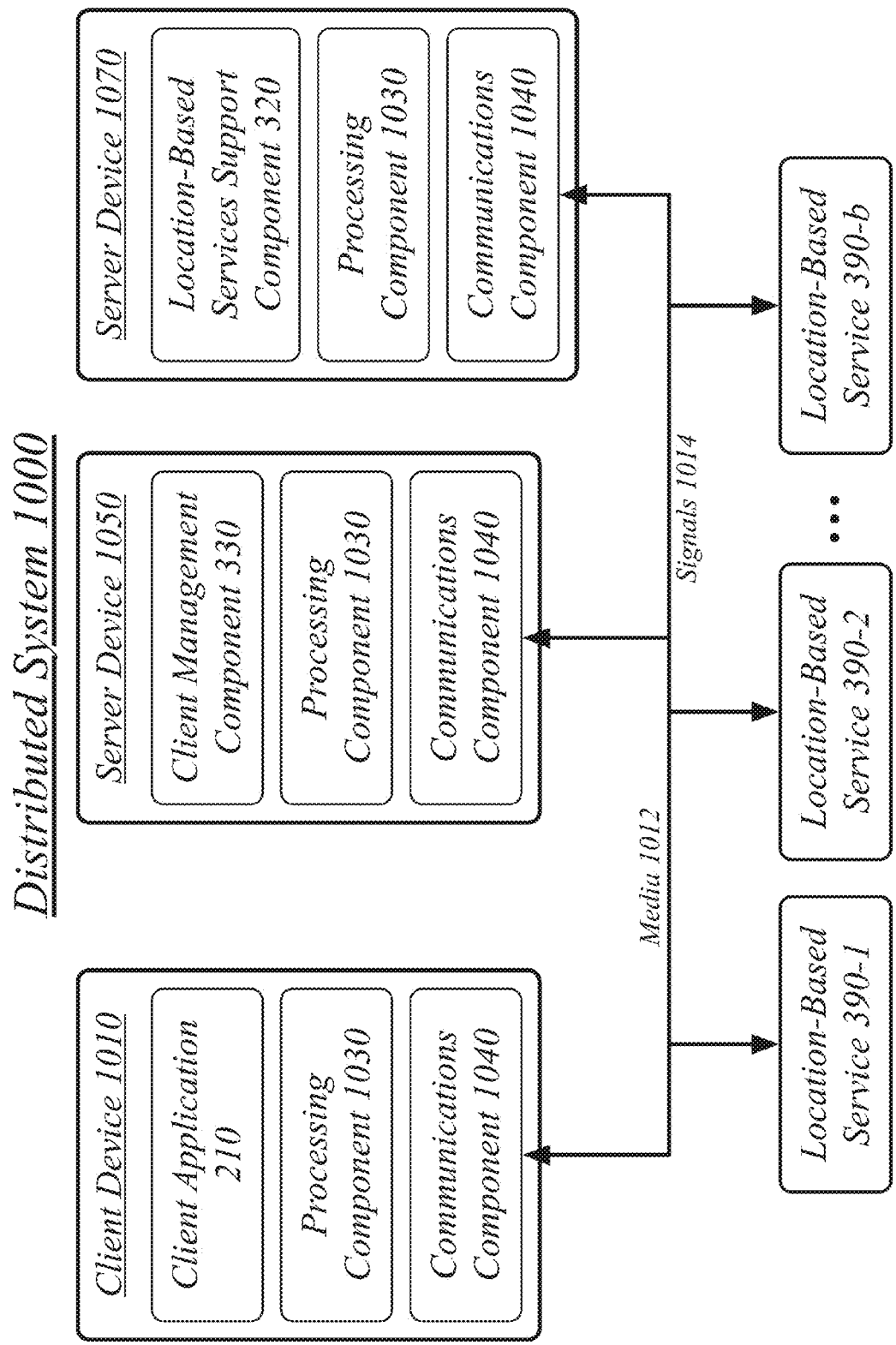
FIG. 10 illustrates an embodiment of a distributed system for the location-based services system of FIG. 1.

FIG. 10 illustrates a block diagram of a distributed system 1000. The distributed system 1000 may distribute portions of the structure and/or operations for the location-based services system 100 across multiple computing entities. Examples of distributed system 1000 may include without limitation a client-server architecture, a S-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1000 may comprise a client device 1010 and a server device 1050. In general, the client device 1010 and the server device 1050 may be the same or similar to the device 920 as described with reference to FIG. 9. For instance, the client system 1010 and the server system 1050 may each comprise a processing component 1030 and a communications component 1040 which are the same or similar to the processing component 930 and the communications component 940, respectively, as described with reference to FIG. 9. In another example, the devices 1010, 1050 may communicate over a communications media 1012 using communications signals 1014 via the communications components 1040.

The client device 1010 may comprise or employ one or more client programs that operate to perform various methodologies in accordance with the described embodiments. In one embodiment, for example, the client device 1010 may implement the client application 210. A portion of signals 1014 sent over media 1012 may correspond to the exchange of location requests and location updates with the client management component 330.

The server devices 1050, 1070 may comprise or employ one or more server programs that operate to perform various methodologies in accordance with the described embodiments. In one embodiment, for example, the server device 1050 may implement the client management component. The server device 1070 may implement the location-based service support component 320. As such, the server devices 1050, 1070 may distribute the workload of monitoring client devices and interacting with location-based services 390. A portion of signals 1014 may correspond to the coordination of location update requests between the client management component 330 and the location-based services support component 320.

Figure 11:
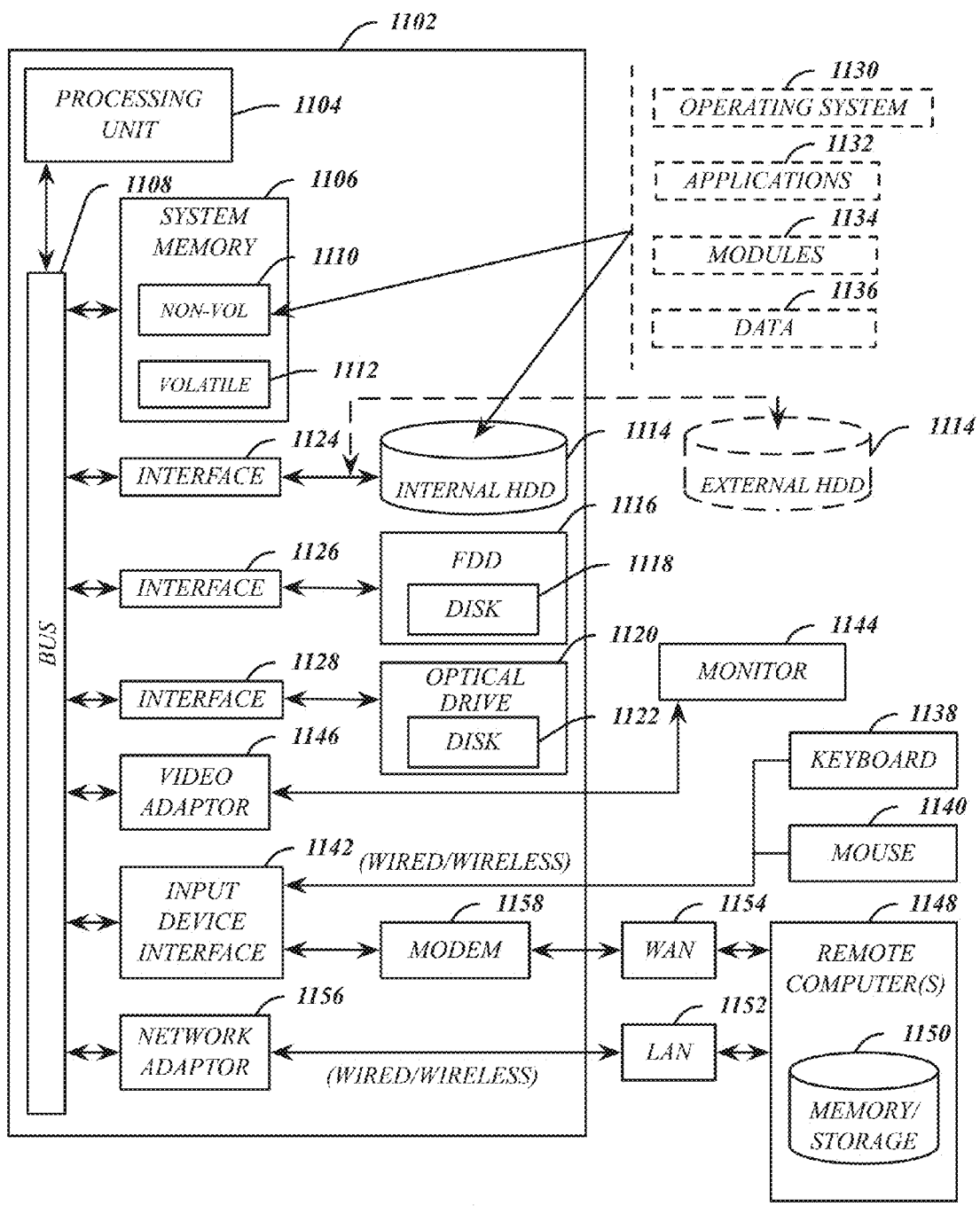
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 9 and FIG. 10, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the location-based services system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
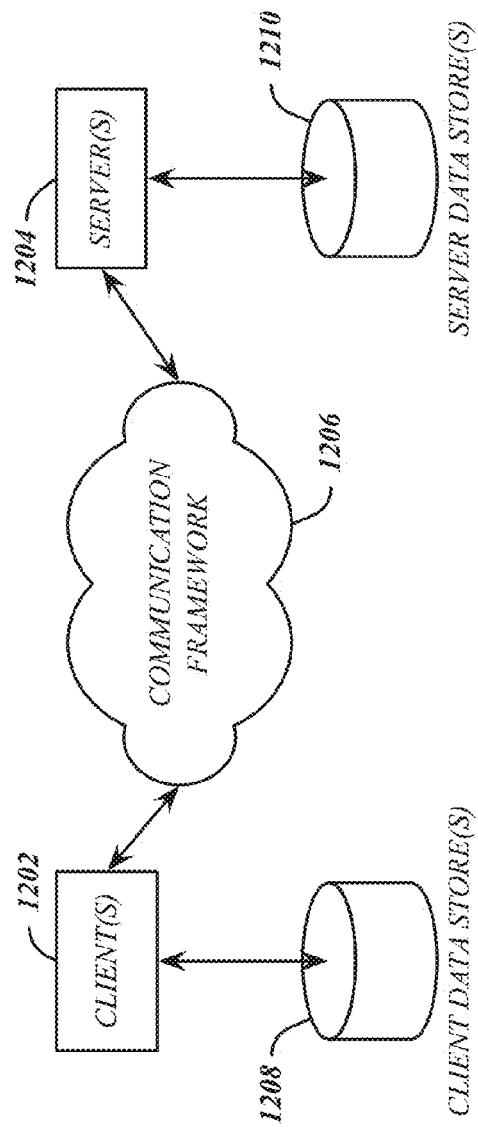
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 910. The servers 1204 may implement the server device 950. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 13:
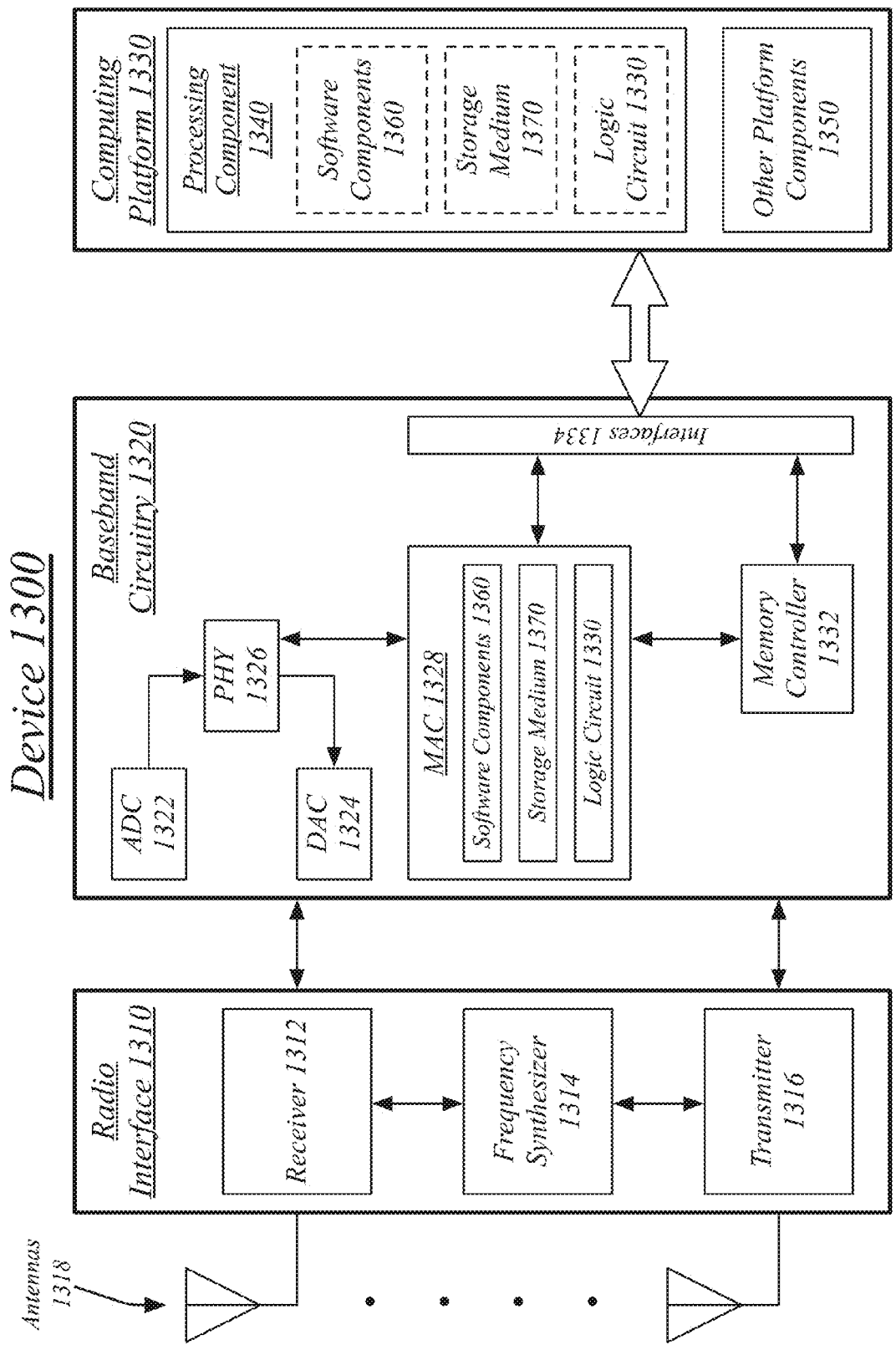
FIG. 13 illustrates an embodiment of a radio device architecture.

FIG. 13 illustrates an embodiment of a device 1300 for use in a multicarrier OFDM system, such as the location-based services system 100. Device 1300 may implement, for example, software components 1360 as described with reference to location-based services system 100 and/or a logic circuit 1330. The logic circuit 1330 may include physical circuits to perform operations described for the location-based services system 100. As shown in FIG. 13, device 1300 may include a radio interface 1310, baseband circuitry 1320, and computing platform 1330, although embodiments are not limited to this configuration.

The device 1300 may implement some or all of the structure and/or operations for the location-based services system 100 and/or logic circuit 1330 in a single computing entity, such as entirely within a single device. Alternatively, the device 1300 may distribute portions of the structure and/or operations for the location-based services system 100 and/or logic circuit 1330 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1310 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1310 may include, for example, a receiver 1312, a transmitter 1316 and/or a frequency synthesizer 1314. Radio interface 1310 may include bias controls, a crystal oscillator and/or one or more antennas 1318. In another embodiment, radio interface 1310 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1320 may communicate with radio interface 1310 to process receive and/or transmit signals and may include, for example, an analog-to-digital converter 1322 for down converting received signals, a digital-to-analog converter 1324 for up converting signals for transmission. Further, baseband circuitry 1320 may include a baseband or physical layer (PHY) processing circuit 1356 for PHY link layer processing of respective receive/transmit signals. Baseband circuitry 1320 may include, for example, a processing circuit 1328 for medium access control (MAC)/data link layer processing. Baseband circuitry 1320 may include a memory controller 1332 for communicating with processing circuit 1328 and/or a computing platform 1330, for example, via one or more interfaces 1334.

In some embodiments, PHY processing circuit 1326 may include a frame construction and/or detection module, in combination with additional circuitry such as a buffer memory, to construct and/or deconstruct communication frames, such as radio frames. Alternatively or in addition, MAC processing circuit 1328 may share processing for certain of these functions or perform these processes independent of PHY processing circuit 1326. In some embodiments, MAC and PHY processing may be integrated into a single circuit.

The computing platform 1330 may provide computing functionality for the device 1300. As shown, the computing platform 1330 may include a processing component 1340. In addition to, or alternatively of, the baseband circuitry 1320, the device 1300 may execute processing operations or logic for the system 100 and logic circuit 1330 using the processing component 1340. The processing component 1340 (and/or PHY 1326 and/or MAC 1328) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1330 may further include other platform components 1350. Other platform components 1350 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1300 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1300 described herein, may be included or omitted in various embodiments of device 1300, as suitably desired. In some embodiments, device 1300 may be configured to be compatible with protocols and frequencies associated one or more of the 3GPP LTE Specifications and/or IEEE 1302.16 Standards for WMANs, and/or other broadband wireless networks, cited herein, although the embodiments are not limited in this respect.

Embodiments of device 1300 may be implemented using single input single output (SISO) architectures. However, certain implementations may include multiple antennas (e.g., antennas 1318) for transmission and/or reception using adaptive antenna techniques for beamforming or spatial division multiple access (SDMA) and/or using MIMO communication techniques.

The components and features of device 1300 may be implemented using any combination of discrete circuitry, application specific integrated circuits (ASICs), logic gates and/or single chip architectures. Further, the features of device 1300 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise determining that a network service is scheduled for a location update from a mobile device; determining, using a processor circuit, a location accuracy based on the network service; transmitting a location request to the mobile device using a network interface component, the location request specifying the location accuracy determined based on the network service; receiving a response to the location request from the mobile device, the response comprising a location of the mobile device conforming to the specified location accuracy; and updating the network service with the received location of the mobile device.

A computer-implemented method may further comprise the location request specifying the location accuracy empowering the mobile device to select between at least GPS-based location determination, Wi-Fi-based location determination, and cellular-tower-proximity-based location determination.

A computer-implemented method may further comprise the location request specifying at least one of a maximum age for which the location of the mobile device may be reported and a maximum response time for the mobile device to respond to the location request.

A computer-implemented method may further comprise the location request transmitted to a local application on the mobile device, the response received from the local application on the mobile device, the response received from the local application on a timing determined by the local application corresponding to the mobile device already having an active radio transmitter.

A computer-implemented method may further comprise the location request transmitted to a local application on the mobile device in response to the local application indicating that the mobile device has an active radio receiver.

A computer-implemented method may further comprise the location request transmitted to a local application on the mobile device, the response received from the local application on the mobile device, the response received from the local application on a timing determined by the local application based on the local application determining that the mobile device had determined its location to within the location accuracy in response to a request by a different application on the mobile device.

A computer-implemented method may further comprise the response received via an intermediary mobile device, the response transmitted to the intermediary mobile device from the mobile device using a peer-to-peer radio connection.

A computer-implemented method may further comprise the location request specifying a delay distance, the location request indicating a permission to the mobile device to delay transmission of the response to the location request when the location of the mobile device indicates a change in location of the mobile device since a previous update less than the delay distance.

A computer-implemented method may further comprise the location request specifying a delay distance, the location request indicating an instruction to the mobile device to activate a radio transmitter of the mobile device when the location of the mobile device indicates a change in location of the mobile device since a previous update greater than the delay distance.

An apparatus may comprise a processor circuit on a device; a location-based services support component operative on the processor circuit to determine that a network service is scheduled for a location update from a mobile device, determine a location accuracy based on the network service, and update the network service with a received location of the mobile device; and a client management component operative on the processor circuit to transmit a location request to the mobile device, the location request specifying the location accuracy determined based on the network service and receive a response to the location request from the mobile device, the response comprising the location of the mobile device conforming to the specified location accuracy. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   determining, by a server, that a network service of a plurality of network services is scheduled to receive a location update from a mobile device registered with the plurality of network services;
   determining, using a processor circuit on the server, a location accuracy requested by the network service, wherein the location accuracy specifies an allowable margin for error in a location;
   transmitting, by the server, a location request to the mobile device using a network interface component, the location request specifying the location accuracy requested by the network service;
   receiving, at the server, a response to the location request from the mobile device, the response comprising a location of the mobile device and the location accuracy of the location; and
   updating the network service and any of the plurality of network services, by the server, with the received location of the mobile device when a location accuracy requested by any of the plurality of network services is at or below the location accuracy received in the response.

2. The method of claim 1, the location request specifying the location accuracy empowering the mobile device to select between at least GPS-based location determination, Wi-Fi-based location determination, and cellular-tower-proximity-based location determination.

3. The method of claim 1, the location request specifying at least one of a maximum age for which the location of the mobile device may be reported and a maximum response time for the mobile device to respond to the location request.

4. The method of claim 1, the location request transmitted to a local application on the mobile device, the response received from the local application on the mobile device, the response received from the local application on a timing determined by the local application corresponding to the mobile device already having an active radio transmitter.

5. The method of claim 1, the location request transmitted to a local application on the mobile device in response to the local application indicating that the mobile device has an active radio receiver.

6. The method of claim 1, the location request transmitted to a local application on the mobile device, the response received from the local application on the mobile device, the response received from the local application on a timing determined by the local application based on the local application determining that the mobile device had determined its location to within the location accuracy in response to a request by a different application on the mobile device.

7. The method of claim 1, the response received via an intermediary mobile device, the response transmitted to the intermediary mobile device from the mobile device using a peer-to-peer radio connection.

8. The method of claim 1, the location request specifying a delay distance, the location request indicating a permission to the mobile device to delay transmission of the response to the location request when the location of the mobile device indicates a change in location of the mobile device since a previous update less than the delay distance.

9. The method of claim 1, the location request specifying a delay distance, the location request indicating an instruction to the mobile device to activate a radio transmitter of the mobile device when the location of the mobile device indicates a change in location of the mobile device since a previous update greater than the delay distance.

10. An apparatus, comprising:
   a processor circuit on a device;
   a location-based services support component operative on the processor circuit to determine that a network service of a plurality of network services is scheduled to receive a location update from a mobile device registered with the plurality of network services, determine a location accuracy requested by the network service, wherein the location accuracy specifies an allowable margin for error in a location, and update the network service and any of the plurality of network services with a received location and location accuracy of the location of the mobile device when a location accuracy requested by any of the plurality of network services is at or below the location accuracy received; and
   a client management component operative on the processor circuit to transmit a location request to the mobile device, the location request specifying the location accuracy requested by the network service and receive a response to the location request from the mobile device, the response comprising the location of the mobile device and the location accuracy of the location.

11. The apparatus of claim 10, the location request transmitted to a local application on the mobile device, the response received from the local application on the mobile device, the response received from the local application on a timing determined by the local application corresponding to the mobile device already having an active radio transmitter.

12. The apparatus of claim 10, the location request transmitted to a local application on the mobile device, the response received from the local application on the mobile device, the response received from the local application on a timing determined by the local application based on the local application determining that the mobile device had determined its location to within the location accuracy in response to a request by a different application on the mobile device.

13. The apparatus of claim 10, the response received via an intermediary mobile device, the response transmitted to the intermediary mobile device from the mobile device using a peer-to-peer radio connection.

14. The apparatus of claim 10, the location request specifying a delay distance, the location request indicating a permission to the mobile device to delay transmission of the response to the location request when the location of the mobile device indicates a change in location of the mobile device since a previous update less than the delay distance.

15. The apparatus of claim 10, the location request specifying a delay distance, the location request indicating an instruction to the mobile device to activate a radio transmitter of the mobile device when the location of the mobile device indicates a change in location of the mobile device since a previous update greater than the delay distance.

16. At least one non-transitory computer-readable storage medium comprising instructions that, when executed, cause a system to:
   determine, by a server, that a network service of a plurality of network services is scheduled to receive a location update from a mobile device registered with the plurality of network service;
   determine, using a processor circuit on the server, a location accuracy requested by the network service, wherein the location accuracy specifies an allowable margin for error in a location;
   transmit, by the server, a location request to the mobile device using a network interface component, the location request specifying the location accuracy requested by the network service;
   receive, at the server, a response to the location request from the mobile device, the response comprising a location of the mobile device and the location accuracy of the location; and
   update the network service and any of the plurality of network services, by the server, with the received location of the mobile device when a location accuracy requested by any of the plurality of network services is at or below the location accuracy received in the response.

17. The non-transitory computer-readable storage medium of claim 16, the location request transmitted to a local application on the mobile device, the response received from the local application on the mobile device, the response received from the local application on a timing determined by the local application corresponding to the mobile device already having an active radio transmitter.

18. The non-transitory computer-readable storage medium of claim 16, the location request transmitted to a local application on the mobile device, the response received from the local application on the mobile device, the response received from the local application on a timing determined by the local application based on the local application determining that the mobile device had determined its location to within the location accuracy in response to a request by a different application on the mobile device.

19. The non-transitory computer-readable storage medium of claim 16, the response received via an intermediary mobile device, the response transmitted to the intermediary mobile device from the mobile device using a peer-to-peer radio connection.

20. The non-transitory computer-readable storage medium of claim 16, the location request specifying a delay distance, the location request indicating a permission to the mobile device to delay transmission of the response to the location request when the location of the mobile device indicates a change in location of the mobile device since a previous update less than the delay distance, the location request indicating an instruction to the mobile device to activate a radio transmitter of the mobile device when the location of the mobile device indicates a change in location of the mobile device since a previous update greater than the delay distance.

* * * * *